United States Patent
Slusar et al.

(10) Patent No.: US 12,060,062 B2
(45) Date of Patent: Aug. 13, 2024

(54) ROUTE RISK MITIGATION

(71) Applicant: ARITY INTERNATIONAL LIMITED, Belfast (IE)

(72) Inventors: Mark V. Slusar, Chicago, IL (US); Jason Brian Bogovich, Kent, OH (US); Julie A. Jordan Peters, Libertyville, IL (US)

(73) Assignee: ARITY INTERNATIONAL LIMITED (IE)

( * ) Notice: Subject to any disclaimer, the term of this patent is extended or adjusted under 35 U.S.C. 154(b) by 0 days.

(21) Appl. No.: 18/103,307

(22) Filed: Jan. 30, 2023

(65) Prior Publication Data

US 2023/0249683 A1 Aug. 10, 2023

Related U.S. Application Data

(60) Continuation of application No. 15/900,861, filed on Feb. 21, 2018, now Pat. No. 11,565,695, which is a
(Continued)

(51) Int. Cl.
*B60W 30/14* (2006.01)
*B60W 30/09* (2012.01)
(Continued)

(52) U.S. Cl.
CPC .......... *B60W 30/143* (2013.01); *B60W 30/09* (2013.01); *B60W 60/0059* (2020.02);
(Continued)

(58) Field of Classification Search
CPC ............... B60W 30/143; B60W 30/09; B60W 60/0059; B60W 50/082; B60W 2050/146;
(Continued)

(56) References Cited

U.S. PATENT DOCUMENTS 83,960 A 11/1868 Heator
4,119,166 A 10/1978 Ayotte et al.
(Continued)

FOREIGN PATENT DOCUMENTS

CN 101131588 A 2/2008
DE 102010001006 A1 7/2011
(Continued)

OTHER PUBLICATIONS

Jan. 15, 2015 (US) Non-Final Office Action—U.S. Appl. No. 14/163,761 (6591.556), 20 Pages.
(Continued)

*Primary Examiner* — Rami Khatib
(74) *Attorney, Agent, or Firm* — Akerman LLP

(57) ABSTRACT

A method is disclosed for analyzing historical accident information to adjust driving actions of an autonomous vehicle over a travel route in order to avoid accidents which have occurred over the travel route. Historical accident information for the travel route can be analyzed to, for example, determine accident types which occurred over the travel route and determine causes and/or probable causes of the accident types. In response to determining accident types and causes/probable causes of the accident types over the travel route, adjustments can be made to the driving actions planned for the autonomous vehicle over the travel route. In addition, in an embodiment, historical accident information can be used to analyze available travel routes and select a route which presents less risk of accident than others.

20 Claims, 8 Drawing Sheets

Related U.S. Application Data continuation of application No. 14/733,576, filed on Jun. 8, 2015, now Pat. No. 9,932,033, which is a continuation-in-part of application No. 14/697,153, filed on Apr. 27, 2015, now Pat. No. 10,037,579, which is a division of application No. 14/100,754, filed on Dec. 9, 2013, now Pat. No. 9,020,751, which is a division of application No. 12/118,021, filed on May 9, 2008, now Pat. No. 8,606,512.

(60) Provisional application No. 60/917,169, filed on May 10, 2007.

(51) Int. Cl.
- B60W 50/08 (2020.01)
- B60W 50/14 (2020.01)
- B60W 60/00 (2020.01)
- G01C 21/00 (2006.01)
- G01C 21/34 (2006.01)
- G06Q 40/08 (2012.01)

(52) U.S. Cl.
CPC ..... *G01C 21/3461* (2013.01); *G01C 21/3874* (2020.08); *G06Q 40/08* (2013.01); *B60W 50/082* (2013.01); *B60W 2050/146* (2013.01); *B60W 2520/10* (2013.01); *B60W 2520/26* (2013.01); *B60W 2552/00* (2020.02); *B60W 2552/05* (2020.02); *B60W 2552/10* (2020.02); *B60W 2552/20* (2020.02); *B60W 2552/35* (2020.02); *B60W 2552/40* (2020.02); *B60W 2555/20* (2020.02); *B60W 2556/10* (2020.02); *B60W 2556/50* (2020.02); *B60W 2710/18* (2013.01); *B60W 2710/20* (2013.01); *B60W 2720/10* (2013.01)

(58) Field of Classification Search
CPC ......... B60W 2520/10; B60W 2520/26; B60W 2552/00; B60W 2552/05; B60W 2552/10; B60W 2552/20; B60W 2552/35; B60W 2552/40; B60W 2555/20; B60W 2556/10; B60W 2556/50; B60W 2710/18; B60W 2710/20; B60W 2720/10; G01C 21/3461; G01C 21/3874; G06Q 40/08
See application file for complete search history.

(56) References Cited

U.S. PATENT DOCUMENTS

| | | | |
|---|---|---|---|
| 4,622,636 A | 11/1986 | Tachibana | |
| 4,706,072 A | 11/1987 | Ikeyama | |
| 4,926,336 A | 5/1990 | Yamada | |
| 5,053,964 A | 10/1991 | Mister et al. | |
| 5,270,708 A | 12/1993 | Kamishima | |
| 5,295,551 A | 3/1994 | Sukonick | |
| 5,430,432 A | 7/1995 | Camhi et al. | |
| 5,465,079 A | 11/1995 | Bouchard et al. | |
| 5,475,387 A | 12/1995 | Matsumoto | |
| 5,572,449 A | 11/1996 | Tang et al. | |
| 5,680,122 A | 10/1997 | Mio | |
| 5,710,565 A | 1/1998 | Shirai et al. | |
| 5,797,134 A | 8/1998 | McMillan et al. | |
| 5,848,373 A | 12/1998 | DeLorme et al. | |
| 6,026,345 A | 2/2000 | Shah et al. | |
| 6,060,989 A | 5/2000 | Gehlot | |
| 6,064,970 A | 5/2000 | McMillan et al. | |
| 6,116,369 A | 9/2000 | King et al. | |
| 6,128,559 A | 10/2000 | Saitou et al. | |
| 6,186,793 B1 | 2/2001 | Brubaker | |
| 6,188,950 B1 | 2/2001 | Tsutsumi et al. | |
| 6,265,978 B1 | 7/2001 | Atlas | |
| 6,301,530 B1 | 10/2001 | Tamura | |
| 6,366,207 B1 | 4/2002 | Murphy | |
| 6,389,351 B1 | 5/2002 | Egawa et al. | |
| 6,415,226 B1 | 7/2002 | Kozak | |
| 6,502,020 B2 | 12/2002 | Lang | |
| 6,502,035 B2 | 12/2002 | Levine | |
| 6,647,328 B2 | 11/2003 | Walker | |
| 6,675,094 B2 | 1/2004 | Russell et al. | |
| 6,707,378 B2 | 3/2004 | MacNeille et al. | |
| 6,732,024 B2 | 5/2004 | Wilhelm Rekow et al. | |
| 6,780,077 B2 | 8/2004 | Baumgartner et al. | |
| 6,868,386 B1 | 3/2005 | Henderson et al. | |
| 6,931,309 B2 | 8/2005 | Phelan et al. | |
| 6,982,635 B2 | 1/2006 | Obradovich | |
| 7,054,831 B2 | 5/2006 | Koenig | |
| 7,116,248 B2 | 10/2006 | Lu et al. | |
| 7,133,771 B1 | 11/2006 | Nesbitt | |
| 7,186,199 B1 | 3/2007 | Baxter, Jr. | |
| 7,242,112 B2 | 7/2007 | Wolf et al. | |
| 7,286,825 B2 | 10/2007 | Shishido et al. | |
| 7,304,589 B2 | 12/2007 | Kagawa | |
| 7,315,239 B2 | 1/2008 | Cheng et al. | |
| 7,339,483 B1 | 3/2008 | Farmer | |
| 7,353,111 B2 | 4/2008 | Takahashi et al. | |
| 7,356,516 B2 | 4/2008 | Richey et al. | |
| 7,366,892 B2 | 4/2008 | Spaur et al. | |
| 7,389,198 B1 | 6/2008 | Dimitriadis | |
| 7,546,206 B1 | 6/2009 | Miller et al. | |
| 7,610,210 B2 | 10/2009 | Helitzer et al. | |
| 7,650,211 B2 | 1/2010 | Wang et al. | |
| 7,657,370 B2 | 2/2010 | Nagase et al. | |
| 7,657,441 B2 | 2/2010 | Richey et al. | |
| 7,660,725 B2 | 2/2010 | Wahlbin et al. | |
| 7,664,589 B2 | 2/2010 | Etori et al. | |
| 7,739,087 B2 | 6/2010 | Qiu | |
| 7,805,321 B2 | 9/2010 | Wahlbin et al. | |
| 7,818,187 B2 | 10/2010 | Wahlbin et al. | |
| 7,821,421 B2 | 10/2010 | Tamir et al. | |
| 7,822,384 B2 | 10/2010 | Anschutz et al. | |
| 7,937,278 B1 | 5/2011 | Cripe et al. | |
| 7,966,118 B2 | 6/2011 | Kade | |
| 7,991,629 B2 | 8/2011 | Gay et al. | |
| 8,031,062 B2 | 10/2011 | Smith | |
| 8,065,169 B1 | 11/2011 | Oldham et al. | |
| 8,078,349 B1 | 12/2011 | Prada Gomez et al. | |
| 8,078,382 B2 | 12/2011 | Sugano et al. | |
| 8,086,523 B1 | 12/2011 | Palmer | |
| 8,090,598 B2 | 1/2012 | Bauer et al. | |
| 8,108,083 B2 | 1/2012 | Kameyama | |
| 8,139,109 B2 | 3/2012 | Schmiedel et al. | |
| 8,145,393 B2 | 3/2012 | Foster et al. | |
| 8,152,589 B2 | 4/2012 | Bowen et al. | |
| 8,160,809 B2 | 4/2012 | Farwell et al. | |
| 8,180,655 B1 | 5/2012 | Hopkins, III | |
| 8,195,394 B1 | 6/2012 | Zhu et al. | |
| 8,204,666 B2 | 6/2012 | Takeuchi et al. | |
| 8,229,618 B2 | 7/2012 | Tolstedt et al. | |
| 8,280,308 B2 | 10/2012 | Anschutz et al. | |
| 8,280,752 B1 | 10/2012 | Cripe et al. | |
| 8,290,701 B2 | 10/2012 | Mason et al. | |
| 8,314,718 B2 | 11/2012 | Muthaiah et al. | |
| 8,326,473 B2 | 12/2012 | Simpson et al. | |
| 8,335,607 B2 | 12/2012 | Gatten et al. | |
| 8,352,112 B2 | 1/2013 | Mudalige | |
| 8,407,139 B1 | 3/2013 | Palmer | |
| 8,457,827 B1 | 6/2013 | Ferguson et al. | |
| 8,457,892 B2 | 6/2013 | Aso et al. | |
| 8,538,785 B2 | 9/2013 | Coleman et al. | |
| 8,549,318 B2 | 10/2013 | White et al. | |
| 8,554,468 B1 | 10/2013 | Bullock | |
| 8,566,126 B1 | 10/2013 | Hopkins, III | |
| 8,577,703 B2 | 11/2013 | McClellan et al. | |
| 8,595,037 B1 | 11/2013 | Hyde et al. | |
| 8,606,512 B1 | 12/2013 | Bogovich et al. | |
| 8,620,575 B2 | 12/2013 | Vogt et al. | |
| 8,620,693 B1 | 12/2013 | Schumann, Jr. | |
| 8,639,535 B1 | 1/2014 | Kazenas | |
| 8,659,436 B2 | 2/2014 | Ngo | |
| 8,676,466 B2 | 3/2014 | Mudalige | |
| 8,686,844 B1 | 4/2014 | Wine | |

(56) References Cited

U.S. PATENT DOCUMENTS

| | | |
|---|---|---|
| 8,718,861 B1 | 5/2014 | Montemerlo et al. |
| 8,725,311 B1 | 5/2014 | Breed |
| 8,750,306 B2 | 6/2014 | Yousefi et al. |
| 8,757,309 B2 | 6/2014 | Schmitt et al. |
| 8,781,669 B1 | 7/2014 | Teller et al. |
| 8,798,841 B1 | 8/2014 | Nickolaou et al. |
| 8,799,036 B1 | 8/2014 | Christensen et al. |
| 8,812,330 B1 | 8/2014 | Cripe et al. |
| 8,818,725 B2 | 8/2014 | Ricci |
| 8,930,269 B2 | 1/2015 | He et al. |
| 8,949,016 B1 | 2/2015 | Ferguson et al. |
| 8,954,226 B1 | 2/2015 | Binion et al. |
| 8,996,303 B1 | 3/2015 | Bogovich et al. |
| 9,020,751 B1 | 4/2015 | Bogovich et al. |
| 9,046,374 B2 | 6/2015 | Ricci |
| 9,063,543 B2 | 6/2015 | An et al. |
| 9,079,587 B1 | 7/2015 | Rupp et al. |
| 9,141,582 B1 | 9/2015 | Brinkmann et al. |
| 9,188,985 B1 | 11/2015 | Hobbs et al. |
| 9,216,737 B1 | 12/2015 | Zhu et al. |
| 9,262,787 B2 | 2/2016 | Binion et al. |
| 9,330,571 B2 | 5/2016 | Ferguson et al. |
| 9,338,607 B2 | 5/2016 | Takehara et al. |
| 9,355,423 B1 | 5/2016 | Slusar |
| 9,355,546 B2 | 5/2016 | Kim et al. |
| 9,373,149 B2 | 6/2016 | Abhyanker |
| 9,384,148 B2 | 7/2016 | Muttik et al. |
| 9,390,451 B1 | 7/2016 | Slusar |
| 9,433,843 B2 | 9/2016 | Morlock |
| 9,457,814 B2 | 10/2016 | Kim et al. |
| 9,495,874 B1 | 11/2016 | Zhu et al. |
| 9,605,970 B1 | 3/2017 | Day et al. |
| 9,618,359 B2 | 4/2017 | Weast et al. |
| 9,648,107 B1 | 5/2017 | Penilla et al. |
| 9,679,487 B1 | 6/2017 | Hayward |
| 9,691,298 B1 | 6/2017 | Hsu-Hoffman et al. |
| 9,715,711 B1 | 7/2017 | Konrardy et al. |
| 9,739,627 B1 | 8/2017 | Chintakindi |
| 9,758,039 B2 | 9/2017 | Hannon |
| 9,765,516 B2 | 9/2017 | Van Dinther et al. |
| 9,767,516 B1 | 9/2017 | Konrardy et al. |
| 9,792,656 B1 | 10/2017 | Konrardy et al. |
| 9,801,580 B2 | 10/2017 | Iizuka et al. |
| 9,851,214 B1 | 12/2017 | Chintakindi |
| 9,858,621 B1 | 1/2018 | Konrardy et al. |
| 9,865,019 B2 | 1/2018 | Bogovich et al. |
| 9,870,649 B1 | 1/2018 | Fields et al. |
| 9,904,289 B1 | 2/2018 | Hayward |
| 9,904,900 B2 | 2/2018 | Cao |
| 9,922,374 B1 | 3/2018 | Vose et al. |
| 9,928,432 B1 | 3/2018 | Sathyanarayana et al. |
| 9,931,062 B2 | 4/2018 | Cavallaro et al. |
| 9,932,033 B2 | 4/2018 | Slusar et al. |
| 9,940,834 B1 | 4/2018 | Konrardy et al. |
| 9,946,334 B2 | 4/2018 | Pala et al. |
| 9,953,300 B2 | 4/2018 | Connor |
| 9,972,054 B1 | 5/2018 | Konrardy et al. |
| 9,996,883 B2 | 6/2018 | Bogovich et al. |
| 10,012,510 B2 | 7/2018 | Denaro |
| 10,037,578 B2 | 7/2018 | Bogovich et al. |
| 10,037,579 B2 | 7/2018 | Bogovich et al. |
| 10,037,580 B2 | 7/2018 | Bogovich et al. |
| 10,046,618 B2 | 8/2018 | Kirsch et al. |
| 10,074,139 B2 | 9/2018 | Bogovich et al. |
| 10,078,871 B2 | 9/2018 | Sanchez et al. |
| 10,096,038 B2 | 10/2018 | Ramirez et al. |
| 10,127,737 B1 | 11/2018 | Manzella et al. |
| 10,157,422 B2 | 12/2018 | Jordan Peters et al. |
| 10,229,462 B2 | 3/2019 | Bogovich et al. |
| 10,657,597 B1 | 5/2020 | Billman et al. |
| 2001/0020902 A1 | 9/2001 | Tamura |
| 2001/0020903 A1 | 9/2001 | Wang |
| 2001/0039509 A1 | 11/2001 | Dar et al. |
| 2002/0022920 A1 | 2/2002 | Straub |
| 2002/0024464 A1 | 2/2002 | Kovell et al. |
| 2002/0095249 A1 | 7/2002 | Lang |
| 2002/0111725 A1 | 8/2002 | Burge |
| 2002/0111738 A1 | 8/2002 | Iwami et al. |
| 2002/0120396 A1 | 8/2002 | Boies et al. |
| 2002/0128882 A1 | 9/2002 | Nakagawa et al. |
| 2002/0178033 A1 | 11/2002 | Yoshioka et al. |
| 2003/0043045 A1 | 3/2003 | Yasushi et al. |
| 2003/0128107 A1 | 7/2003 | Wilkerson |
| 2003/0182165 A1 | 9/2003 | Kato et al. |
| 2003/0187704 A1 | 10/2003 | Hashiguchi et al. |
| 2004/0021583 A1 | 2/2004 | Lau et al. |
| 2004/0036601 A1 | 2/2004 | Obradovich |
| 2004/0054452 A1 | 3/2004 | Bjorkman |
| 2004/0068555 A1 | 4/2004 | Satou |
| 2004/0098464 A1 | 5/2004 | Koch et al. |
| 2004/0103006 A1 | 5/2004 | Wahlbin et al. |
| 2004/0103010 A1 | 5/2004 | Wahlbin et al. |
| 2004/0128613 A1 | 7/2004 | Sinisi |
| 2004/0142678 A1 | 7/2004 | Krasner |
| 2004/0153362 A1 | 8/2004 | Bauer et al. |
| 2004/0236476 A1 | 11/2004 | Chowdhary |
| 2004/0254698 A1 | 12/2004 | Hubbard et al. |
| 2004/0260579 A1 | 12/2004 | Tremiti |
| 2005/0091175 A9 | 4/2005 | Farmer |
| 2005/0096836 A1* | 5/2005 | Minami ............ G07C 5/008 |
| | | 701/123 |
| 2005/0107951 A1 | 5/2005 | Brulle-Drews et al. |
| 2005/0137757 A1 | 6/2005 | Phelan et al. |
| 2005/0174217 A1 | 8/2005 | Basir et al. |
| 2005/0228622 A1 | 10/2005 | Jacobi |
| 2005/0256638 A1 | 11/2005 | Takahashi et al. |
| 2005/0264404 A1 | 12/2005 | Franczyk et al. |
| 2005/0273263 A1 | 12/2005 | Egami et al. |
| 2005/0283503 A1 | 12/2005 | Hancock et al. |
| 2005/0288046 A1 | 12/2005 | Zhao et al. |
| 2006/0006990 A1 | 1/2006 | Obradovich |
| 2006/0053038 A1 | 3/2006 | Warren et al. |
| 2006/0055565 A1 | 3/2006 | Kawamata et al. |
| 2006/0095301 A1 | 5/2006 | Gay |
| 2006/0129313 A1 | 6/2006 | Becker et al. |
| 2006/0129445 A1 | 6/2006 | McCallum, Jr. |
| 2006/0161341 A1 | 7/2006 | Haegebarth et al. |
| 2006/0184321 A1 | 8/2006 | Kawakami et al. |
| 2006/0206623 A1 | 9/2006 | Gipps et al. |
| 2006/0221328 A1 | 10/2006 | Rouly |
| 2006/0247852 A1 | 11/2006 | Kortge et al. |
| 2006/0253307 A1 | 11/2006 | Warren et al. |
| 2007/0021910 A1 | 1/2007 | Iwami et al. |
| 2007/0027583 A1 | 2/2007 | Tamir et al. |
| 2007/0032929 A1 | 2/2007 | Yoshioka et al. |
| 2007/0136107 A1 | 6/2007 | Maguire et al. |
| 2007/0167147 A1 | 7/2007 | Krasner et al. |
| 2007/0182532 A1 | 8/2007 | Lengning et al. |
| 2007/0216521 A1 | 9/2007 | Guensler et al. |
| 2007/0256499 A1 | 11/2007 | Pelecanos et al. |
| 2007/0257815 A1 | 11/2007 | Gunderson et al. |
| 2007/0282638 A1 | 12/2007 | Surovy |
| 2008/0004802 A1 | 1/2008 | Horvitz |
| 2008/0013789 A1 | 1/2008 | Shima et al. |
| 2008/0033637 A1 | 2/2008 | Kuhlman et al. |
| 2008/0059007 A1 | 3/2008 | Whittaker et al. |
| 2008/0059351 A1 | 3/2008 | Richey et al. |
| 2008/0091309 A1 | 4/2008 | Walker |
| 2008/0091490 A1 | 4/2008 | Abrahams et al. |
| 2008/0114542 A1 | 5/2008 | Nambata et al. |
| 2008/0148409 A1 | 6/2008 | Ampunan et al. |
| 2008/0161987 A1 | 7/2008 | Breed |
| 2008/0167757 A1 | 7/2008 | Kanevsky et al. |
| 2008/0243558 A1 | 10/2008 | Gupte |
| 2008/0258890 A1 | 10/2008 | Follmer et al. |
| 2008/0288406 A1 | 11/2008 | Seguin et al. |
| 2008/0319602 A1 | 12/2008 | McClellan et al. |
| 2009/0012703 A1 | 1/2009 | Aso et al. |
| 2009/0024419 A1 | 1/2009 | McClellan et al. |
| 2009/0063201 A1 | 3/2009 | Nowotarski et al. |
| 2009/0079839 A1 | 3/2009 | Fischer et al. |
| 2009/0115638 A1 | 5/2009 | Shankwitz et al. |
| 2009/0140887 A1 | 6/2009 | Breed et al. |
| 2009/0312945 A1 | 12/2009 | Sakamoto et al. |

(56) References Cited

U.S. PATENT DOCUMENTS

| | | |
|---|---|---|
| 2010/0023183 A1 | 1/2010 | Huang et al. |
| 2010/0030586 A1 | 2/2010 | Taylor et al. |
| 2010/0042314 A1 | 2/2010 | Vogt et al. |
| 2010/0131300 A1 | 5/2010 | Collopy et al. |
| 2010/0131304 A1 | 5/2010 | Collopy et al. |
| 2010/0131307 A1 | 5/2010 | Collopy et al. |
| 2010/0138244 A1 | 6/2010 | Basir |
| 2010/0211270 A1 | 8/2010 | Chin et al. |
| 2010/0238009 A1 | 9/2010 | Cook et al. |
| 2010/0250087 A1 | 9/2010 | Sauter |
| 2010/0256852 A1 | 10/2010 | Mudalige |
| 2010/0280751 A1 | 11/2010 | Breed |
| 2010/0302371 A1 | 12/2010 | Abrams |
| 2010/0324775 A1 | 12/2010 | Kermani et al. |
| 2010/0332131 A1 | 12/2010 | Horvitz et al. |
| 2011/0029170 A1 | 2/2011 | Hyde et al. |
| 2011/0043350 A1 | 2/2011 | Ben David |
| 2011/0071718 A1 | 3/2011 | Norris et al. |
| 2011/0077028 A1 | 3/2011 | Wilkes, III et al. |
| 2011/0161119 A1 | 6/2011 | Collins |
| 2011/0173015 A1 | 7/2011 | Chapman et al. |
| 2011/0202305 A1 | 8/2011 | Willis et al. |
| 2011/0210867 A1 | 9/2011 | Benedikt |
| 2012/0034876 A1 | 2/2012 | Nakamura et al. |
| 2012/0053808 A1 | 3/2012 | Arai et al. |
| 2012/0072243 A1 | 3/2012 | Collins et al. |
| 2012/0083960 A1 | 4/2012 | Zhu et al. |
| 2012/0101660 A1 | 4/2012 | Hattori |
| 2012/0109418 A1 | 5/2012 | Lorber |
| 2012/0123641 A1 | 5/2012 | Ferrin et al. |
| 2012/0123806 A1 | 5/2012 | Schumann, Jr. et al. |
| 2012/0173290 A1 | 7/2012 | Collins et al. |
| 2012/0197669 A1 | 8/2012 | Kote et al. |
| 2012/0209505 A1 | 8/2012 | Breed et al. |
| 2012/0290146 A1 | 11/2012 | Dedes et al. |
| 2012/0295592 A1 | 11/2012 | Peirce |
| 2013/0006469 A1 | 1/2013 | Green et al. |
| 2013/0006674 A1 | 1/2013 | Bowne et al. |
| 2013/0006675 A1 | 1/2013 | Bowne et al. |
| 2013/0013179 A1 | 1/2013 | Lection et al. |
| 2013/0018549 A1 | 1/2013 | Kobana et al. |
| 2013/0030606 A1 | 1/2013 | Mudalige et al. |
| 2013/0037650 A1 | 2/2013 | Heppe |
| 2013/0046559 A1 | 2/2013 | Coleman et al. |
| 2013/0052614 A1 | 2/2013 | Mollicone et al. |
| 2013/0066511 A1 | 3/2013 | Switkes et al. |
| 2013/0073321 A1 | 3/2013 | Hofmann et al. |
| 2013/0090821 A1 | 4/2013 | Abboud et al. |
| 2013/0116920 A1 | 5/2013 | Cavalcante et al. |
| 2013/0131906 A1 | 5/2013 | Green et al. |
| 2013/0144657 A1 | 6/2013 | Ricci |
| 2013/0147638 A1 | 6/2013 | Ricci |
| 2013/0166325 A1 | 6/2013 | Ganapathy et al. |
| 2013/0179198 A1 | 7/2013 | Bowne et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204645 A1 | 8/2013 | Lehman et al. |
| 2013/0212659 A1 | 8/2013 | Maher et al. |
| 2013/0218603 A1 | 8/2013 | Hagelstein et al. |
| 2013/0218604 A1 | 8/2013 | Hagelstein et al. |
| 2013/0226441 A1 | 8/2013 | Horita |
| 2013/0250933 A1 | 9/2013 | Yousefi et al. |
| 2013/0253809 A1 | 9/2013 | Jones et al. |
| 2013/0261944 A1 | 10/2013 | Koshizen |
| 2013/0297097 A1 | 11/2013 | Fischer et al. |
| 2013/0304513 A1 | 11/2013 | Hyde et al. |
| 2013/0304514 A1 | 11/2013 | Hyde et al. |
| 2013/0311002 A1 | 11/2013 | Isaac |
| 2014/0037938 A1 | 2/2014 | Li et al. |
| 2014/0074512 A1 | 3/2014 | Hare et al. |
| 2014/0080098 A1 | 3/2014 | Price |
| 2014/0088855 A1 | 3/2014 | Ferguson |
| 2014/0108058 A1 | 4/2014 | Bourne et al. |
| 2014/0113619 A1 | 4/2014 | Tibbitts et al. |
| 2014/0136414 A1 | 5/2014 | Abhyanker |
| 2014/0139341 A1 | 5/2014 | Green et al. |
| 2014/0156133 A1 | 6/2014 | Cullinane et al. |
| 2014/0156134 A1 | 6/2014 | Cullinane et al. |
| 2014/0172221 A1 | 6/2014 | Solyom et al. |
| 2014/0172290 A1 | 6/2014 | Prokhorov et al. |
| 2014/0180723 A1 | 6/2014 | Cote et al. |
| 2014/0210644 A1 | 7/2014 | Breed |
| 2014/0257869 A1 | 9/2014 | Binion et al. |
| 2014/0257871 A1 | 9/2014 | Christensen et al. |
| 2014/0257873 A1 | 9/2014 | Hayward et al. |
| 2014/0266795 A1 | 9/2014 | Tseng et al. |
| 2014/0272810 A1 | 9/2014 | Fields et al. |
| 2014/0276090 A1 | 9/2014 | Breed |
| 2014/0278586 A1 | 9/2014 | Sanchez et al. |
| 2014/0300458 A1 | 10/2014 | Bennett |
| 2014/0300494 A1 | 10/2014 | Tseng et al. |
| 2014/0303827 A1 | 10/2014 | Dolgov et al. |
| 2014/0310075 A1 | 10/2014 | Ricci |
| 2014/0310186 A1 | 10/2014 | Ricci |
| 2014/0333468 A1 | 11/2014 | Zhu et al. |
| 2014/0335902 A1 | 11/2014 | Guba et al. |
| 2014/0350970 A1 | 11/2014 | Schumann, Jr. et al. |
| 2014/0358413 A1 | 12/2014 | Trombley et al. |
| 2014/0379384 A1 | 12/2014 | Duncan et al. |
| 2014/0379385 A1 | 12/2014 | Duncan et al. |
| 2014/0380264 A1 | 12/2014 | Misra et al. |
| 2015/0019266 A1 | 1/2015 | Stempora |
| 2015/0025917 A1 | 1/2015 | Stempora |
| 2015/0057931 A1 | 2/2015 | Pivonka |
| 2015/0081404 A1 | 3/2015 | Basir |
| 2015/0088334 A1 | 3/2015 | Bowers et al. |
| 2015/0088550 A1 | 3/2015 | Bowers et al. |
| 2015/0112543 A1 | 4/2015 | Binion et al. |
| 2015/0112730 A1 | 4/2015 | Binion et al. |
| 2015/0112731 A1 | 4/2015 | Binion et al. |
| 2015/0112733 A1 | 4/2015 | Baker et al. |
| 2015/0120124 A1 | 4/2015 | Bartels et al. |
| 2015/0134181 A1 | 5/2015 | Ollis |
| 2015/0142244 A1 | 5/2015 | You et al. |
| 2015/0149017 A1 | 5/2015 | Attard et al. |
| 2015/0149019 A1 | 5/2015 | Pilutti et al. |
| 2015/0158486 A1 | 6/2015 | Healey et al. |
| 2015/0161738 A1 | 6/2015 | Stempora |
| 2015/0166059 A1 | 6/2015 | Ko |
| 2015/0166062 A1 | 6/2015 | Johnson et al. |
| 2015/0166069 A1 | 6/2015 | Engelman et al. |
| 2015/0170287 A1 | 6/2015 | Tirone et al. |
| 2015/0175168 A1 | 6/2015 | Hoye et al. |
| 2015/0179062 A1 | 6/2015 | Ralston et al. |
| 2015/0187013 A1 | 7/2015 | Adams et al. |
| 2015/0187014 A1 | 7/2015 | Adams et al. |
| 2015/0187015 A1 | 7/2015 | Adams et al. |
| 2015/0187019 A1 | 7/2015 | Fernandes et al. |
| 2015/0194055 A1 | 7/2015 | Maass |
| 2015/0217763 A1 | 8/2015 | Reichel et al. |
| 2015/0242953 A1 | 8/2015 | Suiter |
| 2015/0248131 A1 | 9/2015 | Fairfield et al. |
| 2015/0254955 A1 | 9/2015 | Fields et al. |
| 2015/0266455 A1 | 9/2015 | Wilson |
| 2015/0294422 A1 | 10/2015 | Carver et al. |
| 2016/0009291 A1 | 1/2016 | Pallett et al. |
| 2016/0036558 A1 | 2/2016 | Ibrahim et al. |
| 2016/0065116 A1 | 3/2016 | Conger |
| 2016/0086285 A1 | 3/2016 | Jordan Peters et al. |
| 2016/0086393 A1 | 3/2016 | Collins et al. |
| 2016/0089954 A1 | 3/2016 | Rojas Villanueva |
| 2016/0090097 A1 | 3/2016 | Grube et al. |
| 2016/0096531 A1 | 4/2016 | Hoye et al. |
| 2016/0163198 A1 | 6/2016 | Dougherty |
| 2016/0167652 A1 | 6/2016 | Slusar |
| 2016/0189303 A1 | 6/2016 | Fuchs |
| 2017/0011465 A1 | 1/2017 | Anastassov et al. |
| 2017/0021764 A1 | 1/2017 | Adams et al. |
| 2017/0120929 A1 | 5/2017 | Siddiqui et al. |
| 2017/0154636 A1 | 6/2017 | Geiger et al. |
| 2017/0210288 A1 | 7/2017 | Briggs et al. |
| 2017/0219364 A1 | 8/2017 | Lathrop et al. |

(56) References Cited

U.S. PATENT DOCUMENTS

| | | |
|---|---|---|
| 2017/0221149 A1 | 8/2017 | Hsu-Hoffman et al. |
| 2017/0255966 A1 | 9/2017 | Khoury |
| 2018/0037635 A1 | 2/2018 | Grimm et al. |
| 2018/0082383 A1 | 3/2018 | Bogovich et al. |
| 2018/0202822 A1 | 7/2018 | DeLizio |
| 2018/0251128 A1 | 9/2018 | Penilla et al. |
| 2018/0260907 A1 | 9/2018 | Bogovich et al. |
| 2018/0376357 A1 | 12/2018 | Tavares Coutinho et al. |
| 2019/0066223 A1 | 2/2019 | Bogovich et al. |
| 2019/0101649 A1 | 4/2019 | Jensen |

FOREIGN PATENT DOCUMENTS

| | | |
|---|---|---|
| EP | 1296305 A1 | 3/2003 |
| EP | 2293255 A1 | 3/2011 |
| EP | 2471694 A2 | 7/2012 |
| EP | 3303083 A1 | 4/2018 |
| WO | WO-0139090 A1 | 5/2001 |
| WO | WO-2005108928 A1 | 11/2005 |
| WO | WO-2007102405 A1 | 9/2007 |
| WO | WO-2008067872 A1 | 6/2008 |
| WO | WO-2008096376 A1 | 8/2008 |
| WO | WO-2012014042 A2 | 2/2012 |
| WO | WO-2012150591 A2 | 11/2012 |
| WO | WO-2013012926 A1 | 1/2013 |
| WO | WO-2013126582 A1 | 8/2013 |
| WO | WO-2013160908 A2 | 10/2013 |
| WO | WO-2014148975 A1 | 9/2014 |
| WO | WO-2016028228 A1 | 2/2016 |
| WO | WO-2016122881 A1 | 8/2016 |
| WO | WO-2016200762 A1 | 12/2016 |

OTHER PUBLICATIONS

Jan. 21, 2015 (US) Non-Final Office Action—U.S. Appl. No. 14/163,719 (6591.552), 20 Pages.
Apr. 7, 2016 (US) Non-Final Office Action—U.S. Appl. No. 14/163,719, 12 Pages.
Dec. 12, 2016 (US) Notice of Allowance—U.S. Appl. No. 14/832,197, 8 Pages.
Dec. 19, 2016 (US) Final Office Action—U.S. Appl. No. 14/607,433 (006591.00949), 35 Pages.
Dec. 29, 2016 (US) Non-Final Office Action—U.S. Appl. No. 14/458,764, 74 Pages.
Jan. 13, 2016—(US) Non-Final Office Action—U.S. Appl. No. 14/458,744, 74 Pages.
Jan. 29, 2016 (US) Notice of Allowance and Fee(s) Due—U.S. Appl. No. 14/163,741, 7 Pages.
Jun. 22, 2016 (US) Non-Final Office Action—U.S. Appl. No. 14/607,433 (006591.00949), 27 Pages.
Mar. 17, 2016 (US) Notice of Allowance and Fee(s) Due—U.S. Appl. No. 14/163,761, 11 Pages.
Nov. 29, 2016 (US) Non-Final Office—U.S. Appl. No. 14/458,796, 84 Pages.
Oct. 6, 2016—(US) Non-Final Office Action—U.S. Appl. No. 14/184,272, 56 pages.
Oct. 20, 2016 (US) Non-Final Office Action—U.S. Appl. No. 14/816,336, 61 pages.
Oct. 3, 2016—(US) Non-Final Office Action—U.S. Appl. No. 14/733,576, 61 pages.
Oct. 17, 2016 (US) Office Action—U.S. Appl. No. 13/892,598, 27 Pages.
Oct. 21, 2016 (US) Non-Final Office Action—U.S. Appl. No. 14/862,266, 59 Pages.
Oct. 24, 2016 (US) Non-Final Office Action—U.S. Appl. No. 14/816,299, 60 Pages.
Sep. 9, 2016—(US) Non-Final Office Action—U.S. Appl. No. 14/697,131, 51 pages.
Sep. 9, 2016 (US) Non-Final Office Action—U.S. Appl. No. 14/697,141, 53 Pages.
Sep. 9, 2016 (US) Non-Final Office Action—U.S. Appl. No. 14/697,153, 52 pages.
Sep. 9, 2016 (US) Notice of Allowance—U.S. Appl. No. 14/163,719, 8 Pages.
Apr. 7, 2017 (US) Non-Final Office Action—U.S. Appl. No. 14/816,299, 45 Pages.
Apr. 21, 2017 (US) Non-Final Office Action—U.S. Appl. No. 14/862,266, 34 Pages.
Apr. 21, 2017 (US) Non-Final Office Action—U.S. Appl. No. 15/206,521, 41 Pages.
Apr. 5, 2017 (US) Final Office Action—U.S. Appl. No. 14/184,272, 46 Pages.
Apr. 6, 2017 (US) Non-Final Office Action—U.S. Appl. No. 14/697,153, 51 pages.
Apr. 6, 2017 (US) Non-Final Office Action—U.S. Appl. No. 14/816,336, 44 pages.
Aug. 15, 2017 (US) Final Office Action—U.S. Appl. No. 14/458,744, 71 pages.
Aug. 22, 2017 (US) Non-Final Office Action—U.S. Appl. No. 14/673,150, 63 pages.
Aug. 30, 2017 (US) Notice of Allowance—U.S. Appl. No. 14/862,266, 18 Pages.
Aug. 8, 2017 (US) Final Office Action—U.S. Appl. No. 15/015,623, 30 pages.
Dec. 5, 2017 (US) Final Office Action—U.S. Appl. No. 14/816,336 (006591.01019), 43 Pages.
Dec. 20, 2017 (US) Notice of Allowance—U.S. Appl. No. 14/184,272 (006591.00738), 24 Pages.
Dec. 22, 2017 (US) Notice of Allowance—U.S. Appl. No. 14/733,576 (006591.01037), 21 Pages.
Dec. 26, 2017 (US) Notice of Allowance-U.S. Appl. No. 14/163,719 (6591.552), 27 Pages.
Dec. 27, 2017 (US) Non-Final Office Action—U.S. Appl. No. 14/697,131 (6591.1014), 24 Pages.
Feb. 10, 2017 (US) Final Office Action—U.S. Appl. No. 14/733,576, 34 Pages.
Jan. 4, 2017 (US) Non-Final Office Action—U.S. Appl. No. 14/697,141, 31 Pages.
Jan. 12, 2017 (US) Non-Final Office Action—U.S. Appl. No. 14/458,826, 80 Pages.
Jan. 13, 2017 (US) Non-Final Office Action—U.S. Appl. No. 14/458,744, 74 Pages.
Jan. 19, 2017 (US) Final Office Action—U.S. Appl. No. 14/673,150, 38 Pages.
Jan. 4, 2017 (US) Non-Final Office Action—U.S. Appl. No. 14/697,131, 27 Pages.
Jul. 13, 2017—(US) Non-Final Office Action—U.S. Appl. No. 14/735,576, 28 Pages.
Jul. 13, 2017 (US) Final Office Action—U.S. Appl. No. 14/733,576, 28 pages.
Jul. 27, 2017 (US) Final Office Action—U.S. Appl. No. 14/458,826, 61 pages.
Jun. 13, 2017 (US) Final Office Action—U.S. Appl. No. 14/458,764, 76 pages.
Jun. 16, 2017 (US) Final Office Action—U.S. Appl. No. 14/697,131, 34 pages.
Jun. 2, 2017 (US) Non-Final Office Action—U.S. Appl. No. 14/607,433, 65 pages.
Jun. 6, 2017 (US) Final Office Action—U.S. Appl. No. 14/697,141, 33 Pages.
Jun. 1, 2017 (US) Final Office Action—U.S. Appl. No. 14/458,796, 93 Pages.
Mar. 27, 2017 (US) Non-Final Office Action—U.S. Appl. No. 15/015,623, 94 Pages.
May 19, 2017 (US) Notice of Allowance—U.S. Appl. No. 14/163,719, 10 pages.
Nov. 30, 2017 (US) Non-Final Office Action—U.S. Appl. No. 14/697,141 (006591.01015), 20 Pages.
Oct. 3, 2017 (US) Non-Final Office Action—U.S. Appl. No. 14/458,796 (006591.00832), 70 pages.
Oct. 6, 2017 (US) Final Office Action—U.S. Appl. No. 14/697,153 (006591.01016), 28 pages.

(56) References Cited

OTHER PUBLICATIONS

Oct. 26, 2017 (US) Notice of Allowance—U.S. Appl. No. 15/206,521 (006591.01286), 16 Pages.
Oct. 5, 2017 (US) Final Office Action—U.S. Appl. No. 14/607,433 (006591.00949), 33 Pages.
Sep. 7, 2017 (US) Non-Final Office Action—U.S. Appl. No. 14/458,764, 61 pages.
Sep. 21, 2017 (US) Final Office Action—U.S. Appl. No. 14/816,299 (006591.01018), 21 Pages.
Apr. 2, 2018 (US) Non-Final Office Action—U.S. Appl. No. 14/816,336 (006591.01019), 24 Pages.
Apr. 2, 2018 (US) Notice of Allowance—U.S. Appl. No. 14/697,153 (006591.01016), 26 Pages.
Apr. 19, 2018 (US) Final Office Action—U.S. Appl. No. 14/458,764 (6591.830), 60 Pages.
Aug. 14, 2018—(US) Notice of Allowance—U.S. Appl. No. 14/607,433 (006591.00949), 32 Pages.
Dec. 6, 2018—(US) Notice of Allowance—U.S. Appl. No. 15/013,523 (006591.00976), 50 Pages.
Feb. 12, 2018 (US) Notice of Allowance—U.S. Appl. No. 14/673,150(006591.01017), 32 Pages.
Feb. 7, 2018 (US) Non-Final Office Action—U.S. Appl. No. 15/166,638 (006591.01287), 60 Pages.
Jan. 8, 2018 (US) Non-Final Office Action—U.S. Appl. No. 15/015,623 (6591.1073), 16 Pages.
Jun. 5, 2018—(CA) Office Action—Application No. 2,975,087 (006591.01583), 6 Pages.
Jun. 6, 2018—(US) Notice of Allowance—U.S. Appl. No. 15/015,623 (006591.01073), 23 Pages.
Jun. 14, 2018—(US) Final Office Action—U.S. Appl. No. 14/458,796 (006591.00832), 77 Pages.
Mar. 9, 2018 (US) Non-Final Office Action—U.S. Appl. No. 15/013,523 (006591.00976), 101 Pages.
Mar. 13, 2018 (US) Notice of Allowance—U.S. Appl. No. 15/206,521 (006591.01286), 29 Pages.
Mar. 14, 2018 (US) Non-Final Office Action—U.S. Appl. No. 14/607,433 (006591.00949), 24 Pages.
Mar. 29, 2018 (US) Notice of Allowance—U.S. Appl. No. 14/697,141 (006591.01015), 24 Pages.
Mar. 30, 2018 (US) Notice of Allowance—U.S. Appl. No. 14/816,299 (006591.01018), 18 Pages.
May 14, 2018 (US) Non-Final Office Action—U.S. Appl. No. 14/458,826 (006591.00834), 50 Pages.
May 15, 2018 (US) Notice of Allowance—U.S. Appl. No. 14/163,719 (006591.00552), 31 Pages.
May 17, 2018 (US) Notice of Allowance—U.S. Appl. No. 14/697,131 (006591.01014), 23 Pages.
May 18, 2018 (US) Non-Final Office Action—U.S. Appl. No. 14/458,744 (006591.00828), 57 Pages.
Oct. 11, 2018—(US) Notice of Allowance—U.S. Appl. No. 15/206,521 (006591.01286), 26 Pages.
Oct. 22, 2018 (CA) Office Action—Application No. 2,988,134 (006591.01635), 4 Pages.
Sep. 17, 2018—(US) Notice of Allowance—U.S. Appl. No. 15/168,638 (006591.01287), 27 Pages.
Sep. 4, 2018—(US) Notice of Allowance—U.S. Appl. No. 14/816,336 (006591.01019), 26 Pages.
Apr. 5, 2019—(US) Notice of Allowance—U.S. Appl. No. 15/166,638 (006591.01287), 20 Pages.
Aug. 22, 2019—(US) Non-Final Office Action—U.S. Appl. No. 15/974,861 (006591.01776), 128 pages.
Aug. 27, 2019—(US) Non-Final Office Action—U.S. Appl. No. 16/021,678 (006591.01830), 119 pages.
Aug. 27, 2019—(US) Notice of Allowance—U.S. Appl. No. 15/166,638 (006591.01287), 21 pages.
Aug. 22, 2019—(US) Non-Final Office Action—U.S. Appl. No. 16/021,593 (006591.01829), 114 Pages.
Dec. 11, 2019 (US) Non-Final Office Action—U.S. Appl. No. 16/102,089 (006591.01888), 120 Pages.
Dec. 12, 2019—(US) Non-Final Office Action—U.S. Appl. No. 15/827,860 (006591.01666), 131 Pages.
Feb. 11, 2019—(EP) Supplementary Search Report—EP16743839.9 (006591.01584), 9 Pages.
Jan. 8, 2019—(US) Notice of Allowance—U.S. Appl. No. 15/206,521 (006591.01286), 12 Pages.
Jan. 23, 2019—(US) Final Office Action—U.S. Appl. No. 14/458,826 (006591.00834), 48 Pages.
Jan. 28, 2019—(US) Final Office Action—U.S. Appl. No. 14/458,744 (006591.00828), 24 Pages.
Jul. 25, 2019—(US) Non-Final Office Action—U.S. Appl. No. 16/294,103 (006591.02095), 86 pages.
Jun. 18, 2019 (US) Notice of Allowance and Fees Due—U.S. Appl. No. 15/206,521 (006591.01286), 20 Pages.
Jun. 26, 2019—(US) Non-Final Office Action—U.S. Appl. No. 14/458,744 (006591.00828), 29 Pages.
Mar. 21, 2019 (CA) Office Action—Application No. 2,975,087 (006591.01583), 8 Pages.
May 1, 2019—(US) Non-Final Office Action—U.S. Appl. No. 14/458,764 (006591.00830), 71 pages.
May 3, 2019—(US) Non-Final Office Action—U.S. Appl. No. 14/458,796 (006591.00832), 73 pages.
Nov. 26, 2019 (US) Notice of Allowance—U.S. Appl. No. 15/166,638 (006591.01287), 10 Pages.
Nov. 4, 2019—(US) Notice of Allowance—U.S. Appl. No. 14/458,796 (006591.00832), 42 Pages.
Nov. 25, 2019—(IN) Office Action—Application No. 201727043994 (006591.01637), 5 Pages.
Oct. 30, 2019—(US) Notice of Allowance—U.S. Appl. No. 14/458,764 (006591.00830), 42 Pages.
Oct. 31, 2019—(US) Notice of Allowance—U.S. Appl. No. 14/458,744 (006591.00828), 33 Pages.
Sep. 19, 2019—(US) Non-Final Office Action—U.S. Appl. No. 14/458,826 (006591.00834), 59 Pages.
Apr. 16, 2020—(US) Non-Final Office Action—U.S. Appl. No. 15/890,701 (6591.1701), 301 Pages.
Apr. 20, 2020—(US) Notice of Allowance—U.S. Appl. No. 15/206,521 (6591.1286), 9 Pages.
Apr. 20, 2020—(US) Notice of Allowance—U.S. Appl. No. 15/827,860 (6591.1666), 21 Pages.
Apr. 29, 2020—(US) Non-Final Office Action—U.S. Appl. No. 15/900,861 (6591.1712), 140 Pages.
Aug. 18, 2020—(US) Final Office Action—U.S. Appl. No. 15/900,861 (006591.01712), 20 Pages.
Aug. 19, 2020—(US) Notice of Allowance—U.S. Appl. No. 15/827,860 (006591.01666), 12 Pages.
Aug. 26, 2020—(US) Notice of Allowance—U.S. Appl. No. 15/890,701 (006591.01701), 14 Pages.
Aug. 21, 2020—(US) Non-Final Office Action—U.S. Appl. No. 16/021,593 (006591.01829), 36 Pages.
Dec. 18, 2020—(US) Notice of Allowance—U.S. Appl. No. 16/117,069 (006591.01901), 129 Pages.
Dec. 30, 2020—(US) Notice of Allowance—U.S. Appl. No. 15/974,861 (006591.01776), 20 Pages.
Feb. 14, 2020—(US) Final Office Action—U.S. Appl. No. 16/021,678 (006591.01830), 50 Pages.
Feb. 26, 2020—(US) Notice of Allowance—U.S. Appl. No. 15/206,521 (006591.01286), 29 Pages.
Feb. 3, 2020—(US) Notice of Allowance—U.S. Appl. No. 14/458,744 (006591.00828), 20 Pages.
Feb. 4, 2020—(US) Notice of Allowance—U.S. Appl. No. 14/458,764 (006591.00830), 24 Pages.
Feb. 5, 2020—(US) Notice of Allowance—U.S. Appl. No. 14/458,796 (006591.00832), 29 Pages.
Feb. 6, 2020—(US) Final Office Action—U.S. Appl. No. 15/974,861 (006591.01776), 38 Pages.
Jan. 27, 2020—(US) Notice of Allowance—U.S. Appl. No. 14/458,826 (006591.00834), 16 Pages.
Jan. 31, 2020—(US) Final Office Action—U.S. Appl. No. 16/021,593 (006591.01829), 43 Pages.
Jun. 1, 2020—(US) Notice of Allowance—U.S. Appl. No. 14/458,826 (6591.834), 21 Pages.

(56) References Cited

OTHER PUBLICATIONS

Jun. 18, 2020—(US) Notice of Allowance—U.S. Appl. No. 15/166,638 (6591.1287), 34 Pages.
Jun. 9, 2020—(US) Notice of Allowance—U.S. Appl. No. 14/458,764 (6591.830), 23 Pages.
Jun. 9, 2020—(US) Notice of Allowance—U.S. Appl. No. 14/458,796 (6591.832), 21 Pages.
Jun. 9, 2020—(US) Notice of Allowance—U.S. Appl. No. 16/102,089 (6591.1888), 30 Pages.
Mar. 19, 2020—(US) Non-Final Office Action—U.S. Appl. No. 16/294,103 (006591.02095), 54 Pages.
May 21, 2020—(US) Notice of Allowance—U.S. Appl. No. 14/458,744 (6591.828), 19 Pages.
Nov. 16, 2020—(US) Notice of Allowance—U.S. Appl. No. 15/890,701 (006591.01701), 10 Pages.
Oct. 14, 2020—(US) Non-Final Office Action—U.S. Appl. No. 16/021,678 (006591.01830), 35 pages.
Sep. 2, 2020—(US) Notice of Allowance—U.S. Appl. No. 16/294,103 (006591.02095), 42 Pages.
Sep. 21, 2020—(US) Non-Final Office Action—U.S. Appl. No. 15/974,861 (006591.01776), 18 Pages.
Feb. 11, 2021—(EP) Examination Report—App. No. 168080984 (006591.01636), 9 Pages.
Feb. 10, 2021—(US) Notice of Allowance—U.S. Appl. No. 16/021,678 (006591.01830), 13 Pages.
Jan. 11, 2021—(US) Notice of Allowance—U.S. Appl. No. 16/021,593 (006591.01829), 17 Pages.
Jan. 22, 2021—(US) Notice of Allowance—U.S. Appl. No. 15/890,701 (006591.01701), 10 Pages.
Mar. 12, 2021—(US) Non-Final Office Action—U.S. Appl. No. 15/900,861 (006591.01712), 23 Pages.
Mar. 10, 2021—(US) Notice of Allowance—U.S. Appl. No. 16/117,069 (006591.01901), 16 Pages.
"A Leader-Follower Formation Flight Control Scheme for UAV Helicopters," IEEE Xplore, Sep. 1-3, 2008, Retrieved from URL: http://ieeexplore.ieee.org/xpl/login.jsptp=&amumber=4636116&url=http%3A%2F%2Fi . . . , Abstract Downloaded on Dec. 19, 2013, 1 page.
"A semi-autonomous tractor in an intelligent master-slave vehicle system," Retrieved from http://link.springer.com/article/10.1007%2Fs11370-010-0071-6, Oct. 2010, vol. 3(4), downloaded on Dec. 19, 2013, pp. 263-269, 4 pages.
A Velocity Control Strategy for Vehicular Collision Avoidance System, Retrieved from URL:https://ieeexplore.ieee.org/xpl/articleDetails.jsptp=&arnumber=1626838&contentType=Conference-Publications&queryText%3DA+velocity+control+strategy+for . . . , Abstract downloaded on May 9, 2013, 1 page.
Anderson J.M., et al., "Autonomous Vehicle Program: A Guide for Policymakers," Rand Corporation: Transportation, Space, and Technology Program, 2014, 217 Pages.
Anthony D., "Prepare for Deep Auto Insurance Premium Drop Scenario, Celent Report Advises," Insurance & Technology, Published on May 8, 2012, downloaded from http://www.insurancetech.com/claims/prepare-for-deep-auto- nsurance-premium/232901645printer_friendly=this-page, Accessed on Jan. 9, 2014, 3 pages.
Anthony O., "Rapid Emergence of Driverless Cars Demands Creation of Legal Infrastructure, Stanford Scholar Says," Insurance & Technology—Online, Jan. 3, 2013, retrived from URL: http://search.proquest.com.ezproxy.apollolibrary.com/docview/1266314720/fulltext/142DA8916CC2 E861A14/11?accountid=35812, Jan. 8, 2014, 2 pages.
"Auto Insurance Discounts," Liberty Mutual Insurance, Retrieved from the internet: URL: http://www.libertymutual.com/auto-insurance/auto-insurance-coverage/auto-insurance-discounts, downloaded on Jan. 8, 2014, 2 pages.
"Autonomous Car," Wikipedia, the Free Encyclopedia, Retrieved from URL: en.wikipedia.org/wiki/Autonomous_car#cite_ref-28, Downloaded on Nov. 11, 2013, 20 pages.

"Autonomous Vehicles Regulations," California Department of Motor Vehicles, 2011, Retrieved from the Internet: URL: www.dmv.ca.gov/vr/autonomous/auto.htm, Retrieved on Jan. 2, 2014, 3 Pages.
"Background on Self-Driving Cars and Insurance," Auto Technology, Insurance Information Institute, Inc., (006591.01287), Jul. 30, 2018, 7 pages.
Bai F., et al., "Reliability Analysis of DSRC Wireless Communication for Vehicle Safety," Sep. 2006, 8 pages.
Ballard T., et al., "Driver Monitors: Improving Transportation Safety and Enhancing Performance Through Behavioral Change," Society of Petroleum Engineers, (006591.00834), Jan. 1, 2004, pp. 1-3.
Baronti F., et al., "Distributed Sensor for Steering Wheel Grip Force Measurement in Driver Fatigue Detection," Department of Engineering and Information, University of Pisa, Italy, 2009, pp. 1-4.
BC Technology Webpage, "CarCom Intercom System," Retrieved from URL: www.bctechnologyltd.co.uk/clarson-intercom-system-brochure.htm, downloaded May 29, 2013, 2 pages.
BMW.com webpage, "BMW Technology Guide: Car-to-car communication," Retrieved from URL: www.bmw.com/com/en/insights/technology/technology_guide/articles/cartocar_communication.html, downloaded May 5, 2013, 1 page.
Bylund A., "Would You Buy a Self-Driving Car to Save 80% on Auto Insurance," The Motley Fool, Retrived from URL:http://www.dailyfinance.com/2013/11/27/would-you-buy-a-self-driving-car-to-save-80-on-car/, Nov. 27, 2013, 2 pages.
Cafiso S., et al., "Safety Index for Evaluation of Two-Lane Rural Highways," Transportation Research Record, vol. 2019 (1), 2007, pp. 136-145.
"Car2Car Communication," NEC.com, Retrieved from URL: www.NEC.com/en/global.onlinetvlen/society/car_commu_1:html, downloaded on Apr. 5, 2013, 2 pages.
Car-to-Car webpage, "Car-2-Car Communication," Retrived from URL: www.car-to-car.org/index.phpid=8, downloaded May 29, 2013, 1 page.
Chassis Systems Control, "Adaptive Cruise Control: More comfortable driving," Robert Bosch GmbH, Brochure downloaded Oct. 26, 2013, 4 pages.
"Schlaue Autos von A bis Z," Encyclopedia, Retrieved from URL: www.bester-beifahrer.de/startseite/exikon/, downloaded Oct. 27, 2013, 16 pages.
Cohda Wireless webpage, "Welcome to Cohda Wireless," Retrived from URL: www.cohdawireless.com/default.html, downloaded May 29, 2013, 1 page.
Coughlin J.F., et al., "Monitoring, Managing, and Motivating Driver Safety and Well-Being," IEEE Pervasive Computing, (006591.00832), vol. 10 (3), Jul.-Sep. 2011, pp. 14-21.
Cusano J., et al., "Driverless Cars Will Change Auto Insurance. Here's How Insurers Can Adapt, Business Models," Harvard Business School Publishing Corporation, Dec. 5, 2017, 6 Pages.
Dan N., "Who's Behind the Wheel? Nobody. The Driverless Car Is Coming. And We All Should Be Glad It Is," Wall Street Journal (Online) Sep. 24, 2012, Retrived from URL: http://search.proquest.com on Jan. 8, 2014, 4 pages.
Dan S., "Corporate News: Driverless Cars Face Issues of Liability," The Asian Wall Street Journal, ProQuest, Jan. 29, 2013, Retrieved from the Internet: URL: http://search.proquest.com.ezproxy, Retrieved on Jan. 8, 2014, 2 Pages.
"Development of an Intelligent Master-slave System between Agricultural Vehicles," IEEE Xplore, Retrieved from URL: http://ieeexplore.ieee.org/xpl/login.jsptp=&arnumber=5548056&url=http%3A%2F%2Fi . . . , Abstract Downloaded on Dec. 19, 2013, 1 page.
"Direct Adaptive Longitudinal Control of Vehicle Platoons," Retrieved from URL: https://ieeexplore.ieee.org/document/917908?tp=&arnumber=917908&contentType=Journals%20%26%20Magazines&queryText%3DDirect%20adaptive%20longitudinal%20c . . . ,=, Abstract downloaded on May 9, 2013, 1 page.
"Driver Assistance Systems," Robert Bosch GmbH, Retrieved from URL: www.bosch-automotivetechnology.us/en_us/us/driving_comfort_1/driving_comfort_systems_for_passenger_cars_2/driver_assistance_systems_5/driver_assistan, Downloaded on Oct. 27, 2013, 12 pages.

(56) References Cited

OTHER PUBLICATIONS

"Driverless Cars Study: 1 in 5 would let Computers do the Driving," CarInsurance.com, Published on Nov. 4, 2013, Retrieved from URL: http://www.carinsurance.com/press/driverless-cars-survey-results.aspx, Downloaded on Dec. 19, 2013, 2 pages.
EE Herald webpage, "DSRC Packet Sniffer, a Vehicle-to-Vehicle Communication Technology Is Under Demo," Retrived from URL: www.eeherald.com/section/news/nw10000198.html, dated Nov. 22, 2008, 1 page.
Eichler S., et al., "Car-to-Car Communication," dated Oct. 2006, 6 pages.
"Self-Driving Cars: The Next Revolution," KPMG cutting through complexcity, kpmg.com | cargroup.org, 2012, 36 pages.
Evy, et al., "Artificial Intelligence is Here. In Fact, It's All Around US. But It's Nothing Like We Expected," Jan. 2011, 14 pages.
Extended European Search Report for European Application No. 16808098.4 dated May 15, 2019, 9 pages.
Festag A., et al., "Vehicle-to-Vehicle and Road-Side Sensor Communication for Enhanced Road Safety," NEC Laboratories, Nov. 2008, 12 Pages.
Foust B., et al., "Integrated Enterprise Geo-Spatial Technology—Insurance Risk Examples," Direction Magazine, Jan. 27, 2006, Retrieved from the Internet: URL:http://www.directionsmag.com/printer.php?artcicle_id=2081, Retrieved on Jun. 25, 2008, 2 Pages.
"Fuzzy System Representation of Car-following Phenomena," Retrieved from URL: https://ieeexplore.eee.org/xpl/articleDetails.jsp?tp=&arnumber=527798&contentType=Conference+Publications&queryText%3DFuzzy+system+representation+of . . . , Abstract downloaded on May 9, 2013, 1 page.
"Geographic Information Systems Using CODES Linked Data (Crash Outcome Data Evaluation System)," U.S. Department of Transportation National Highway Traffic Safety Administration, downloaded Apr. 8, 2008, Retrieved from the Internet: URL: http://ntl.bts.gov/lib/11000/11100/11149/809-201.pdf, Apr. 2001, 44 pages.
"Get Ready for Automated Cars," Houston Chronicle, Published on Sep. 11, 2012,Accessed on Nov. 11, 2013, 1 page.
Grant R., "Cisco and NXP Encourage Car Communication to Make Driving Safer," Venture Beat, Jan. 4, 2013, Retrieved from the Internet: URL: www.venturebeat.com/2013/01/04/cisco-and-nxp-encourage-car-communication-to-make-driving-safer, 3 Pages.
"Shadow Tracker Prov5 Track Detail Map," Advanced Tracking Technologies, Inc, Jun. 25, 2008, Retrieved from the Internet: URL: http://www.advantrack.com/map_pro_3.htm, 1 Page.
Harris S., "Your Questions Answered: Driverless Cars," The Engineer (Online) Centaur Communications Ltd., (006591.00828), Feb. 17, 2014, ProQuest Web Jan. 18, 2019, 8 pages.
Holdredge W.D., "Gaining Position With Technology," Property/Casualty Insurance, Telematics, the Use of Wireless Communications and Global Positioning System (GPS) Tracking, May Soon Change the Way Automobile Insurance, Both Personal and Commercial, Is Priced, Individual Rating of a Driver, to Supplement Class Rating, Now Appears to Be Feasible, Emphasis, Mar. 2005, Retrieved from the Internet: URL: http;//www.towersperrin.com/TILLINGHAST/publications/publications/emphasis/Emphasis_2005_3/Holderedge.pdf, Retrieved on Apr. 8, 2008, 4 Pages.
"How the Discounts Work," Save as You Drive Discounted Car Insurance Rates for Good Drivers, Jun. 25, 2008, Retrieved from the Internet: URL: http://www.saveasyouddrive.com/page.asp?pageid=34&print=true, 2 Pages.
Ingolfo S., et al., "Law and Adaptivity in Requirements Engineering," SEAMS, 2013, pp. 163-168.
International Preliminary Report on Patentability for International Application No. PCT/US2016/036136, mailed Dec. 21, 2017, 9 pages.
International Search Report and Written Opinion for International Application No. PCT/US2016/013204, mailed Mar. 18, 2018, 10 pages.
International Search Report and Written Opinion for International Application No. PCT/US2017/016176, mailed Apr. 28, 2017, 9 pages.
International Search Report for International Application No. PCT/US2016/036136, mailed Aug. 31, 2016, 03 pages.
"IVOXs Driver Score; Personal Lines; Benefits to using IVOX DriverScore," Ivosdata, Jul. 25, 2008, Retrieved from the Internet: URL: http://www.ivosdata.com/personal_lines.html, 1 page.
Ji Q., et al., "Real-Time Nonintrusive Monitoring and Prediction of Driver Fatigue," IEEE Transactions on Vehicular Technology, vol. 53 (4), Jul. 2004, pp. 1052-1068.
Kim H.M., et al., "Fuzzy Throttle and Brake Control for Platoons of Smart Cars," Fuzzy sets and systems, University of Southern California, Elsevier, 1996, vol. 84, pp. 209-234.
Kirkpatrick K., "Legal Issues With Robots," Communications of the Association for Computing Machinery, Nov. 2013, vol. 56 (11), pp. 17-19.
Kotani K., et al., "Inter-Vehicle Communication Protocol for Cooperatively Capturing and Sharing Intersection Video," IEEE, 2010, 5 pages.
Kurian B., "Auto-Insurance—Driving into the Sunset?," White Paper, Tata Consultancy Service, 2013, 13 Pages.
Leur P.D., et al., "Development of a Road Safety Risk Index," Transportation Research Record, vol. 1784 (1), 2000, pp. 33-42.
Lienert A., "Drivers Would Opt for Autonomous Cars to Save on Insurance, Study Finds," Published on Nov. 7, 2013, Retrived from URL:www.edmunds.com/car-news/drivers-would-opt-for-autonomous-cars-to-save-on-insurance-study-finds.html on Jan. 2, 2014, 6 pages.
Light D., "A Scenario: The End of Auto Insurance," downloaded Nov. 11, 2013, Retrived from URL: www.celent.com/reports/scenario-end-auto-insurance, May 8, 2012, 2 pages.
Litman T., "Autonomous Vehicle Implementation Predictions Implications for Transport Planning," Victoria Transport Policy Institute, Dec. 23, 2013, 19 pages.
"Logistics, Not Consumers, Best Early Market for Premium Traffic Information," ABI Research, Published on Sep. 25, 2006, Retrieved from URL: http://auto.ihs.com/news/2006/abi-premium-traffic.htm, Accessed on Jun. 25, 2008, 2 pages.
Marchant G.E., et al., "The Coming Collision Between Autonomous Vehicles and the Liability System," Santa Clara Law Review, Dec. 17, 2012, vol. 52 (4), 21 Pages.
Miller U.S., "Final Report: What Value May Geographic Information Systems Add to the Art of Identifying Crash Countermeasures? ," Virginia Transportation Research Council, Charlottesville, Virginia, Published on Apr. 1999, Retrieved from URL: http://www.virginiadot.org/vtrc/main/online_reports/pdf/99-r13.pdf; Accessed on Apr. 8, 2008, 43 pages.
Nalker Smith, Bryant, "Summary of levels of Driving Automation for On-Road Vehicles," Stanford Law School: The Center for Internet and Society, Retrieved from URL: http://cyberlaw.stanford.edu/blog/2013/12/sae-levels-diriving-automation, Downloaded on Dec. 18, 2013, 1 page.
NEUMANN P.G., and Contributors, "Risks to the Public," Association for Computing Machinery SIGSOFT Software Engineering Notes, Jul. 2012, vol. 37 (4), pp. 20-29.
"New DriverScore App for Ford SYNC Helps Consumers with Good Driving Discounts," Retrieved from URL: https://www.at.ford.com/en/homepage/news-and-clipsheet/news/2017/1/driverscore.html, on May 31, 2017, 2 Pages.
Newcomb D., "Autonomous Cars Will Usher in Things We Never Saw Coming," Opinions, PC Magazine Digital Edition, (006591.01287), Sep. 2016, pp. 1-4.
Noguchi N., et al., "Development of a Master-Slave Robot System for Arm Operations," Computers and Electronics in Agriculture, 2004, vol. 44, 19 Pages.
O'Brien C., "Autonomous Vehicle Technology: Consideration for the Auto Insurance Industry," The 2nd Connected Vehicles Symposium, Jun. 17, 2013, 4 Pages.
Oki Webpage, "OKI Develops World's First DSRC Inter-vehicle Communication Attachment for Mobile Phones to Help Pedestrian Safety," Jan. 8, 2009, 4 pages.
"Patents," At the Forefront of Technological Innovation, Printed from the Teleatlas.com website, 2007, Retrieved from the Internet:

(56) References Cited

OTHER PUBLICATIONS

URL: http://www.teleatlas.com/WhyTeleAtlas/Innovation/Patents/index.html, Downloaded on Jun. 25, 2008, 1 Page.
"Point-Level Geocoding Option Geocoding Enrichment Solution," Group1 Software, Retrieved from URL: http://www.g1.com/PDF/Product/PointLevelGeocode.pdf, Downloaded on Apr. 8, 2008, 2 pages.
"Preliminary Statement of Policy Concerning Automated Vehicles," National Highway Traffic Safety Administration, Retrieved on Jun. 9, 2014, 14 pages.
"Project SARTRE (Safe Road Trains for the Environment)," Road Traffic Technology, Retrieved from URL: www.roadtraffic-technology.com/projects/the-sartre-project/, Downloaded on May 9, 2013, 4 Pages.
"Quad City Intersection Traffic Accident Study: 1993 Data," Digital Collection—Metadata View, NTL Catalog Record, Retrieved from URL: http://ntlsearch.bts.gov/tris/record/ntl/338.html, Downloaded on Jun. 25, 2008, 2 pages.
"Quad City Intersection Traffic Accident Study," Davenport-Rock Island-Moline Urbanized Area 1993 data, Bi-State Regional Commission, downloaded Apr. 8, 2008, Retrieved from the Internet: URL: http://ntl.bts.gov/lib/000/300/338/00338.pdf, Mar. 1996, 78 pages.
Ruquet M.E., "Who Insures a Driverless Car?," Property & Casualty 360, Oct. 1, 2012, Retrived from URL: http://search.proquest.com on Jan. 8, 2014, 2 pages.
Schmundt H., "Mapping the Streets of the World," Speigel Online, Druckversion, High Technology, May 12, 2006, Retrieved from the Internet: URL: http://www.spiegel.de/international/spiegel/0,1518,415848,00.html, Downloaded on Jun. 25, 2008, 2 Pages.
Sharma A., "Driving the Future: The Legal Implications of Autonomous Vehicles," Autonomous Vehicle Conference Recap, High Tech Law Institute, Jan. 2012, Retrieved from the Internet: URL: law.scu.edu/hightech/autonomousvehicleconfrecap2012, Retrieved on Jan. 2, 2014, 7 Pages.
Sharma D., "Development of Leader-Follower Robot in IIT BOMBAY," Retrieved on May 30, 2013, 4 pages.
Shladover S.E., "What if Cars Could Drive Themselves," ACCESS Magazine, University of California Transportation Center, UC Berkeley, No. 16, Published on Apr. 1, 2000, Downloaded on Dec. 19, 2013, 7 pages.
Telematics Update, "The Autonomous Car: The Road to Driverless Driving," May 30, 2013, Retrived from URL: analysis.telematicsupdate.com//2x-safety/autonomous-car-road-driverless-driving on Jan. 2, 2014, 6 pages.
Telephonics Webpage, "Integrated Communication Systems Wired & Wireless Secure Intercommunications," Retrieved from URL: www.elephonics.com/netcom.asp, downloaded May 29, 2013, 1 page.
"The Munix Advantage," AUMA, Apr. 8, 2014, 1 Page.
"The Use of Occupation and Education Factors in Automobile Insurance", State of New Jersey: Department of Banking and Insurance, Apr. 2008, 581 pages.
Top Issues: An Annual Report, "Strategy: Reshaping Auto Insurance," The insurance industry in 2013, vol. 5, 6 pages.
"Track Playback," Advanced Tracking Technologies, Inc, Jun. 25, 2008, Retrieved from the Internet: URL: http://www.advantrack.com/Animated-Track-Playback.htm, 1 Page.
U.S. Appl. No. 61/391,271, filed Oct. 8, 2010, Specification, Zhu., et al., "Autonomous Vehicles," Google 3.8-292, 006591.00834, 2010, 56 pages.
Wardzinski A., "Dynamic Risk Assessment in Autonomous Vehicles Motion Planning," IEEE, 1st International Conference on Information Technology, Gdansk, [retrieved on Jul. 25, 2016], Retrieved from the Internet: URL: http://kio.pg.gda.pl/iag/download/2008-IEEE%20ICIS-Dynamic%20Risk%20Assessment.pdf, May 18-21, 2008, 4 Pages.
"What is Geocoding?," Thurston Regional Planning Council, Retrieved from URL: http://www.trpc.org/programs/gis/geocode.htm; Accessed on Jun. 25, 2008, 5 Pages.
Wolf Intercom webpage, "Wolf Intercom Systems," Retrived from URL: http://wolfintercom.com/, downloaded May 29, 2013, 2 pages.
Written Opinion for International Application No. PCT/US2016/036136, mailed Aug. 31, 2016, 08 pages.
Wu N., et al., "Petri Net Modeling of the Cooperation Behavior of a Driver and a Copilot in an Advanced Driving Assistance System," IEEE Transactions on Intelligent Transportation Systems, (006591.00830), vol. 12 (4), Dec. 2011, pp. 977-989.
Xu Q., et al., "Vehicle-to-Vehicle Safety Messaging in DSRC," 2004, 10 pages.
Yang X., et al., "A Vehicle-to-Vehicle Communication Protocol for Cooperative Collision Warning," University of Illinois, Aug. 2004, 10 Pages.
Zalstein, David, Car Advice.com webpage, "First large-scale vehicle-to-vehicle communication technology test inveiled" Retrieved from URL: www.caradvice.com.au/187379/first-large-scale-vehicle-to-vehicle-communication-technology-test-unveiled/basic-rgb-4/, downloaded on Aug. 22, 2012, 3 Pages.
Zeng X., et al., "Hazardous Driving Prediction System," Submission to the Connected Vehicle Technology Challenge, Sep. 24, 2014, 20 pages.
Zhu, et al., "User Interface for Displaying Internal State of Autonomous Driving System," Appendix to the Specification, Appendix B, U.S. Appl. No. 61/391,271, filed Oct. 8, 2010, 37 pages.

* cited by examiner

ROUTE RISK MITIGATION

CROSS-REFERENCE TO RELATED APPLICATIONS

This application is a continuation of U.S. patent application Ser. No. 15/900,861, filed Feb. 21, 2018 and entitled "Route Risk Mitigation," which is a continuation of U.S. patent application Ser. No. 14/733,576, filed Jun. 8, 2015 and entitled "Route Risk Mitigation," which is a Continuation-in-Part of U.S. patent application Ser. No. 14/697,153, filed Apr. 27, 2015, and entitled "Route Risk Mitigation," which is a Division of U.S. patent application Ser. No. 14/100,754 (now U.S. Pat. No. 9,020,751), filed Dec. 9, 2013, and entitled "Route Risk Mitigation," which is a Division of U.S. patent application Ser. No. 12/118,021 (now U.S. Pat. No. 8,606,512), filed May 9, 2008 and entitled "Route Risk Mitigation," which claims the benefit of priority from U.S. Provisional Application Ser. No. 60/917,169, filed May 10, 2007, and entitled "Route Risk Mitigation." Each of the foregoing applications is incorporated by reference herein in its entirety for all purposes.

TECHNICAL FIELD

Aspects of the invention relate generally to risk mitigation. More particularly, aspects of the invention relate to using geographically encoded information to mitigate risk of travel route selection by autonomous vehicles.

BACKGROUND

Although insurers may vary insurance premiums based on garaging location (by state, county, etc.), there is a need in the art for enhanced systems and methods to better account for variations in a location-based risk to vehicles and improve travel route selection based on such variation in location-based risks. For example, some insurers use location-based technology such as GPS (global positioning satellites) to monitor the location of autonomous vehicles. Nevertheless, there is a need in the art for a technique for estimating the risk associated with a route selection by the autonomous vehicle using the various aspects disclosed by the present invention. Therefore, there is a benefit in the art for an enhanced method and device for calculating a risk for a road segment and using it to, among other things, select routes that present less risk and thereby mitigate risk.

SUMMARY

Aspects of the invention overcome problems and limitations of the prior art by providing a method for mitigating the risks associated with driving by assigning risk values to road segments and using those risk values to select less risky travel routes, including less risky travel routes for vehicles engaged in autonomous driving over the travel routes.

Various approaches to helping users mitigate risk are presented. In accordance with aspects of the invention, a computing system is disclosed for generating a data store (e.g., database) of risk values. The system may receive various types of information, including but not limited to, accident information, geographic information, and vehicle information, and from one or more data sources. The system calculates a risk value for an associated road segment. Subsequently, the computing system may provide the associated risk value when provided with location information (and/or other information) for the road segment. In an embodiment, separate risk values can be determined for vehicles engaged in autonomous driving over the road segment and vehicles engaged in manual driving over the road segment.

In an alternate embodiment in accordance with aspects of the invention, a personal navigation device, mobile device, personal computing device, and/or vehicle autonomous driving system may communicate, directly or indirectly, with the system's database of risk values. The system may receive travel route information and use that information to retrieve risk values for the associated road segments in the travel route. In addition, an autonomous driving system may select among available routes a route which provides the lowest risk according to the determined or retrieved risk values. The system may send a compilation of the risk values to the device for display on a screen of the device or for recording in memory. The system may also aggregate risk values and form a score that is then sent for display on the screen of the device or sent for recording in a memory. The contents of memory may also be uploaded to a data store for use by, e.g., insurance companies, to determine whether to adjust a quote or premium of an insurance policy.

In an alternate embodiment in accordance with aspects of the invention, a personal navigation device, mobile device, personal computing device, and/or vehicle autonomous driving system may communicate directly or indirectly, with the system's database of risk values. The system may receive regional location information and retrieve the risk values for road segments within the associated region and send the associated information to the device for recording into memory. The device may receive travel route information and query the memory for the associated risk values. The risk values may be sent for display on the device or for recording in memory. The contents of memory may also be uploaded to a system data store for use by, e.g., insurance companies, to determine whether to adjust a quote or premium of an insurance policy, and operators of autonomous vehicles to select travel routes that provide lower risk.

In yet another embodiment, in accordance with aspects of the invention, a personal navigation device, mobile device, personal computing device, and/or vehicle autonomous driving system may access the database of risk values to assist in identifying and presenting alternate lower-risk travel routes. The driver, operator of an autonomous vehicle, or the autonomous vehicle itself may select among the various travel routes presented, taking into account one or more factors such as risk tolerance and/or desire to lower the cost of insurance. These factors may be saved in memory designating the driver/operator's preferences. Depending on the driver/operator's selection/preferences, the cost or other aspects of the vehicle's insurance coverage may be adjusted accordingly for either the current insurance policy period or a future insurance policy period.

In another embodiment, a personal navigation device, mobile device, personal computing device, and/or vehicle autonomous driving system may identify a travel route for an autonomous vehicle, determine an autonomous route risk value for the travel route using historical accident information of vehicles engaged in autonomous driving over the travel route and determine a manual route risk value for the travel route using historical accident information of vehicles engaged in manual driving over the travel route, compare the autonomous route risk value to the manual route risk value and determine which of autonomous driving or manual driving provides a lower risk of accident over the travel route. The device can store the determination that either autonomous driving or manual driving provides the lower risk of accident over the travel route. In addition, according to another aspect of the disclosure, adjustments to driving actions planned for a vehicle engaged in autonomous driving over the travel route can be made to decrease a risk of accident over the travel route.

In another embodiment, a method is disclosed for analyzing historical accident information to adjust driving actions of an autonomous vehicle over a travel route in order to avoid accidents which have occurred over the travel route. Historical accident information for the travel route can be analyzed to, for example, determine accident types which occurred over the travel route and determine causes and/or probable causes of the accident types. In response to determining accident types and causes/probable causes of the accident types over the travel route, adjustments can be made to the driving actions planned for the autonomous vehicle over the travel route. In addition, in an embodiment, historical accident information can be used to analyze available travel routes and select a route which presents less risk of accident than others.

The details of these and other embodiments of the invention are set forth in the accompanying drawings and description below. Other features and advantages of aspects of the invention will be apparent from the description and drawings.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

Figure 1:
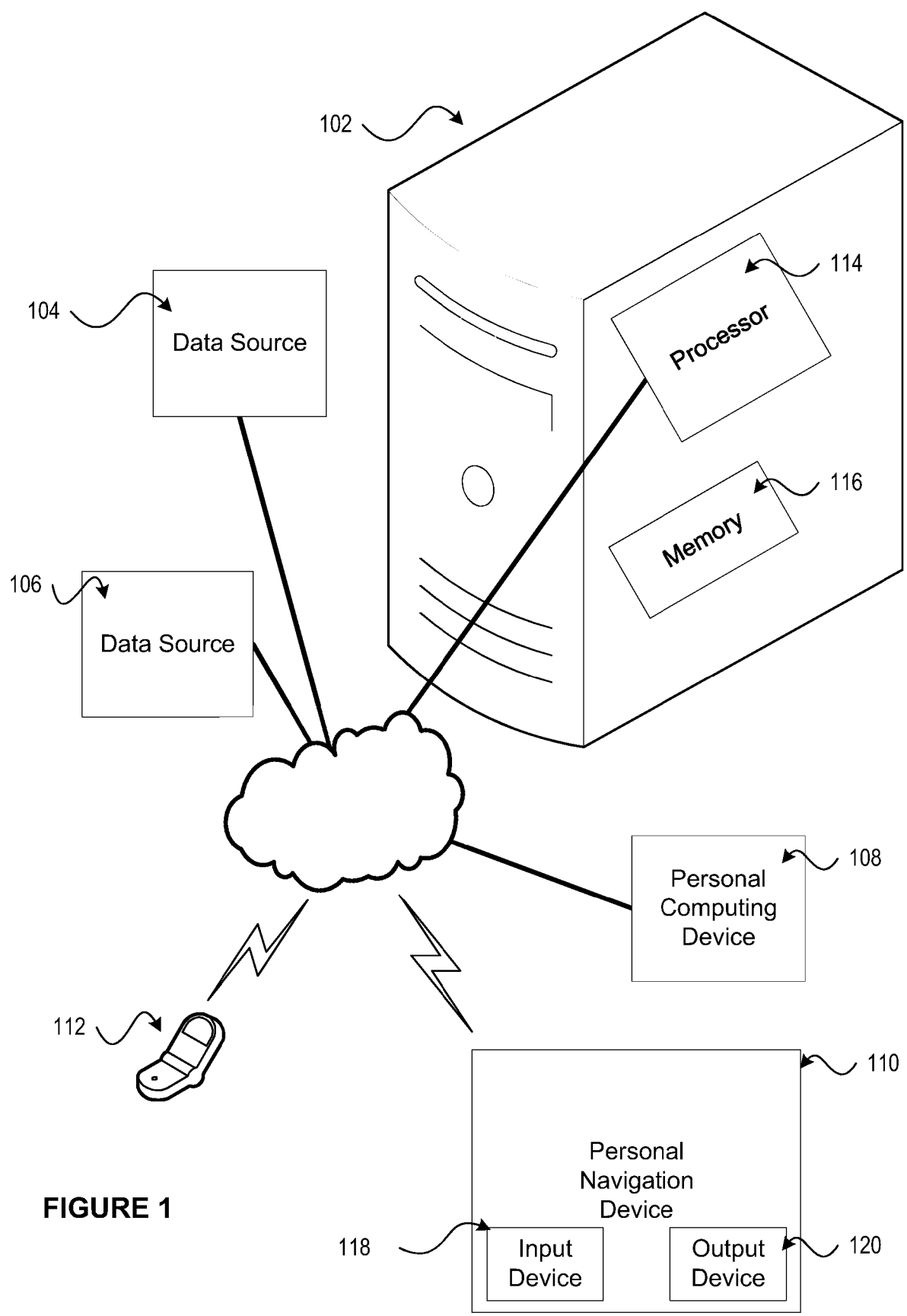
FIG. 1 depicts an illustrative operating environment in accordance with aspects of the invention.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In accordance with aspects of the invention, a new set of pricing tiers are disclosed herein for enabling safe driving and lower rates for insurance policy customers. In addition, various approaches to helping users mitigate risk are presented. In accordance with aspects of the invention, a computing device is disclosed for generating risk values in a data store. The system may receive various types of information, including but not limited to, accident information, geographic information, and vehicle information, including autonomous driving information, from one or more data sources and calculate a risk value for associated road segments. Subsequently, the computing device may provide the associated risk value when provided with location information for a road segment such as regional location information and/or other information.

In an alternate embodiment in accordance with aspects of the invention, a personal navigation device, mobile device, personal computing device, and/or vehicle autonomous driving system may communicate with the database of risk values. The devices may receive information about a travel route and use that information to retrieve risk values for road segments in the travel route. The aggregate of the risk values is sent for display on a screen of the device or for recording in memory of the device. The contents of memory may also be uploaded to a data store for use by, e.g., insurance companies, to determine whether to adjust a quote for insurance coverage or one or more aspects of current insurance coverage such as premium, specific coverages, specific exclusions, rewards, special terms, etc.

In yet another embodiment, in accordance with aspects of the invention, a personal navigation device, mobile device, personal computing device, and/or vehicle autonomous driving system may access the database of risk values to assist in identifying and presenting alternate low-risk travel routes. The driver, operator, or autonomous driving system may select among the various travel routes presented, taking into account risk tolerance and/or cost of insurance. Depending on the route selection, the vehicle's insurance policy may be adjusted accordingly, for either the current insurance policy or a future insurance policy.

In certain embodiments, vehicle sensors, vehicle OBD, and/or vehicle communication systems, route risk determination systems disclosed herein, may collect, transmit, and/or receive data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer may be configured to operate all or some aspects of the vehicle driving, including but not limited to acceleration, deceleration, steering, and/or route navigation. A vehicle with an autonomous driving capability may sense its surroundings using the vehicle sensors and/or receive inputs regarding control of the vehicle from the vehicle communications systems, including but not limited to short range communication systems, Telematics, or other vehicle communication systems.

Referring to FIG. 1, an example of a suitable operating environment in which various aspects of the invention may be implemented is shown in the architectural diagram of FIG. 1. The operating environment is only one example of a suitable operating environment and is not intended to suggest any limitation as to the scope of use or functionality of the inventions. The operating environment may be comprised of one or more data sources 104, 106 in communication with a computing device 102. The computing device 102 may use information communicated from the data sources 104, 106 to generate values that may be stored in a conventional database format. In one embodiment, the computing device 102 may be a high-end server computer with one or more processors 114 and memory 116 for storing and maintaining the values generated. The memory 116 storing and maintaining the values generated need not be physically located in the computing device 102. Rather, the memory (e.g., ROM, flash memory, hard drive memory, RAID memory, etc.) may be located in a remote data store (e.g., memory storage area) physically located outside the computing device 102, but in communication with the computing device 102.

A personal computing device 108 (e.g., a personal computer, tablet PC, handheld computing device, personal digital assistant, mobile device, etc.) may communicate with the computing device 102. Similarly, a personal navigation device 110 (e.g., a global positioning system (GPS), geographic information system (GIS), satellite navigation system, mobile device, vehicle autonomous driving system, other location tracking device, etc.) may communicate with the computing device 102. The communication between the computing device 102 and the other devices 108, 110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the invention, a personal navigation device 110 may operate in a stand-alone manner by locally storing some of the database of values stored in the memory 116 of the computing device 102. For example, a personal navigation device 110 (e.g., a GPS in an automobile or autonomous driving system) may be comprised of a processor, memory, and/or input devices 118/output devices 120 (e.g., keypad, display screen, speaker, etc.). The memory may be comprised of a non-volatile memory that stores a database of values used in calculating an estimated route risk for identified routes. Therefore, the personal navigation device 110 need not communicate with a computing device 102 located at, for example, a remote location in order to calculate identified routes. Rather, the personal navigation device 110 may behave in a stand-alone manner and use its processor to calculate route risk values of identified routes. If desired, the personal navigation device 110 may be updated with an updated database of values after a period of time (e.g., an annual patch with new risk values determined over the prior year).

In yet another embodiment in accordance with aspects of the invention, a personal computing device 108 may operate in a stand-alone manner by locally storing some of the database of values stored in the memory 116 of the computing device 102. For example, a personal computing device 108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108 may use the input device to read the contents of the CD-ROM media in order to calculate a value for the identified route. Rather, the personal computing device 108 may behave in a stand-alone manner and use its processor to calculate a route risk value. If desired, the personal computing device 108 may be provided with an updated database of values (e.g., in the form of updated CD-ROM media) after a period of time. One skilled in the art will appreciate that personal computing device 108, 110, 112 need not be personal to a single user; rather, they may be shared among members of a family, company, etc.

The data sources 104, 106 may provide information to the computing device 102. In one embodiment in accordance with aspects of the invention, a data source may be a computer which contains memory storing data and is configured to provide information to the computing device 102. Some examples of providers of data sources in accordance with aspects of the invention include, but are not limited to, insurance companies, third-party insurance data providers, autonomous vehicle operation providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the invention, access to the information in the data sources 104, 106 may be restricted to only authorized computing devices 102 and for only permissible purposes. For example, access to the data sources 104, 106 may be restricted to only those persons/entities that have signed an agreement (e.g., an electronic agreement) acknowledging their responsibilities with regard to the use and security to be accorded this information.

The computing device 102 uses the information from the data sources 104, 106 to generate values that may be used to calculate an estimated route risk. Some examples of the information that the data sources 104, 106 may provide to the computing device 102 include, but are not limited to, accident information, geographic information, route information, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident, whether the vehicle was engaged in autonomous or manual driving when the accident occurred.

In an embodiment, accident information can be categorized. For example, in an embodiment, accident information categories can include an accident type, cause of accident, and/or probable cause of accident. For example, a cause of accident can include, loss of control of vehicle and collision with wildlife. For example, a cause of accident or probable cause of accident can include excess speed and lack vehicle traction on the road.

Accident information associated with vehicle accidents may be stored in a database format and may be compiled per road or route segment. One skilled in the art will understand that the term segment may be interchangeably used to describe a road or route segment, including but not limited to an intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, global positioning satellite (GPS) device, vehicle autonomous driving system; examples of this information include speed at impact, brakes applied, throttle position, direction at impact, whether the vehicle is engaged in manual or autonomous driving. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the invention, a data source 104 may provide the computing device 102 with accident information that is used to generate values (e.g., create new values and/or update existing values). The computing device 102 may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of the invention, a data source 104 may provide the computing device 102 with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102 may use at least part of the received geographic information to calculate a value, associate the value with a road segment (or other location information), and store the value in a database format. Numerous examples of geographic information were provided above. For example, a computing device 102 may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of the invention, the computing device may use accident information, geographic information, vehicle information, and/or other information, either alone or in combination, in calculating risk values in a database format.

The values generated by the computing device 102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the invention, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
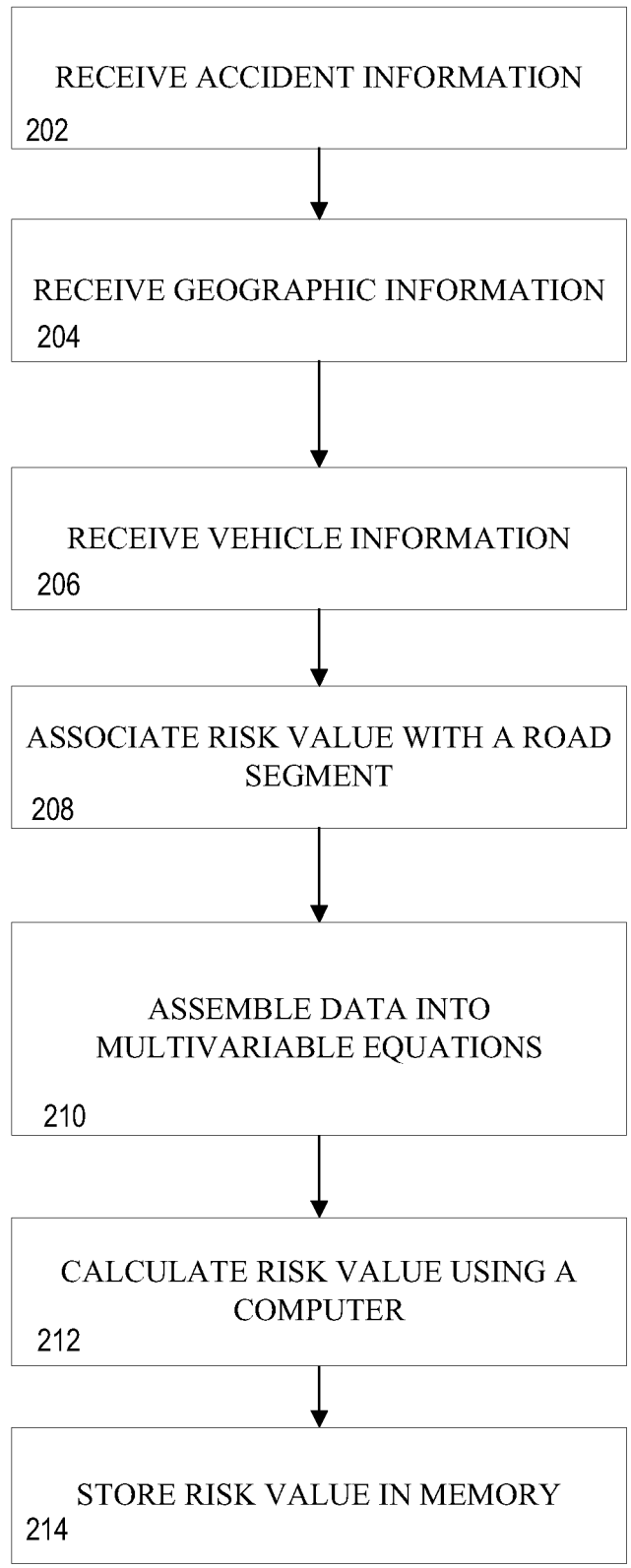
FIG. 2 depicts illustrative steps for calculating the risk value of a route segment by applying actuarial and/or statistical methods in accordance with aspects of the invention.

Referring to FIG. 2, in accordance with aspects of the invention, a computing device 102 may receive accident information (in step 202), geographic information (in step 204), and/or vehicle information (in step 206). The computing device 102 may calculate (in step 212) the risk value for a road segment (or point of risk) by applying actuarial techniques to the information that may be received from data sources 104, 106. In one embodiment, the computing device 102 receives and stores the accident information in a data store with the latitude/longitude and time of the incident. The accident data is associated with a location and combined with other accident data associated with the same location (in step 210). Applying actuarial and/or statistical modeling techniques involving multiple predictors, such as generalized linear models and non-linear models, a risk value may be calculated (212), and the calculated risk value may be recorded in memory (116) (in step 214). The multiple predictors involved in the statistical model used to calculate a risk value may include accident information, geographic information, and vehicle information, including whether the vehicle was operating autonomously or manually at the time of the accident. Associating the risk value (in step 208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example business rules may identify an incident location using the address of the nearest intersection. In yet another example the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 104, 106 in accordance with aspects of the invention. In addition, some information may also be recorded in third-party data sources that may be accessible to one or more insurance companies. For example, traffic information (e.g., traffic volume) and weather information may be retrieved in real-time (or near real-time) from their respective data sources.

Figure 3:
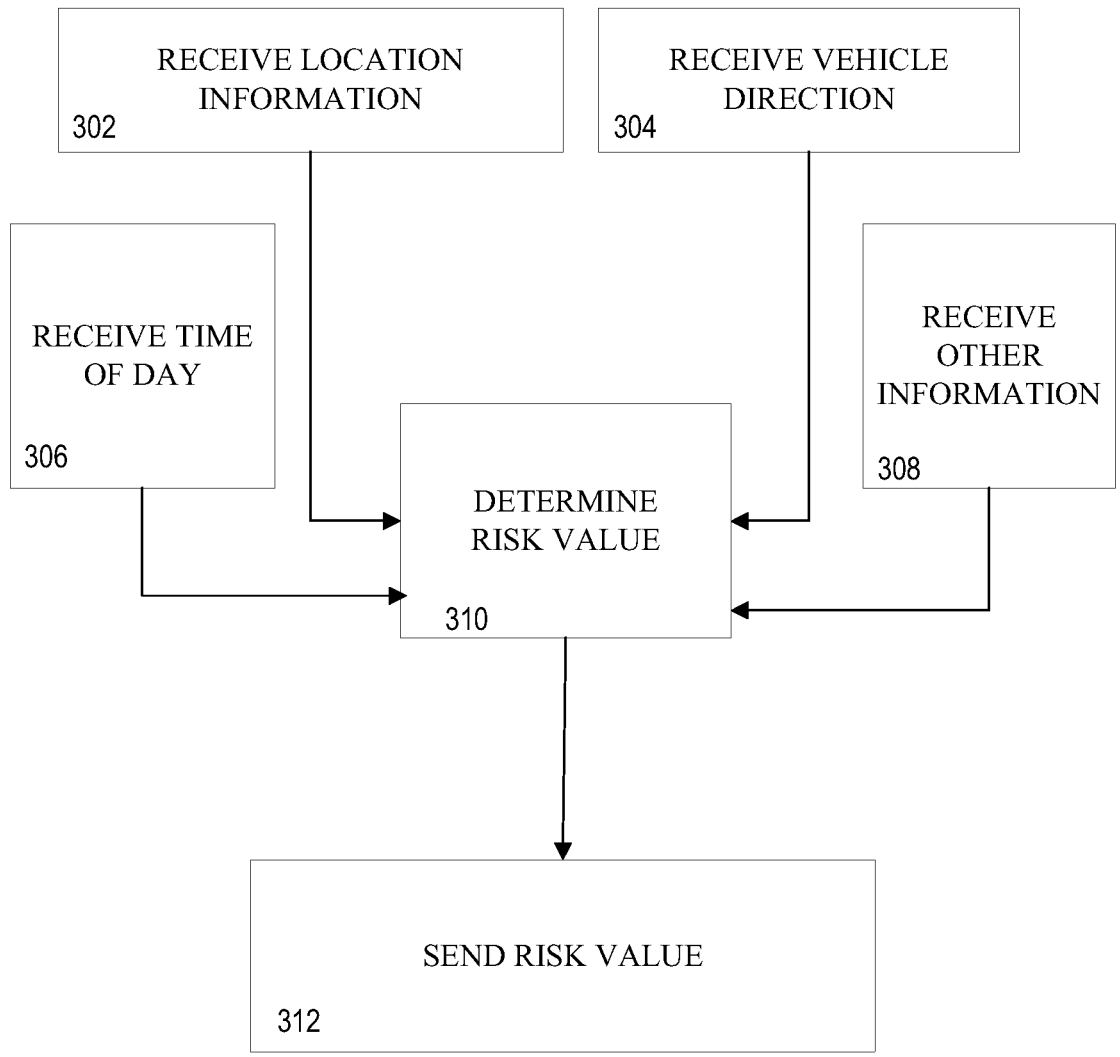
FIG. 3 depicts illustrative steps for determining and providing risk values to a computing device in accordance with aspects of the invention.

Referring to FIG. 3, in accordance with aspects of the invention, the computing device 102 may send (in step 312) the risk value corresponding to a road segment when it receives location information (in step 302) requesting the risk associated with a particular location. The particular location information may be in the form of longitude/latitude coordinates, street address, intersection, closest address, or other form of information. Furthermore, in an alternative embodiment the accuracy of the risk value may be improved by submitting the direction that a vehicle travels (or may travel) through a road segment. The computing device 102 may receive (in step 304) the vehicle direction and use it to determine the risk value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate risk value (in step 310).

Likewise, the computing device 102 may also receive (in step 308) other information to enhance the accuracy of the risk value associated with a travel route. For example, the computing device 102 may receive (in step 306) the time of day when the driver is driving (or plans to drive) through a particular travel route. This information may improve the accuracy of the risk value retrieved (in step 310) for the travel route. For example, a particular segment of road through a wilderness area may have a higher rate of accidents involving deer during the night hours, but no accidents during the daylight hours. Therefore, the time of day may also be considered when retrieving the appropriate risk value (in step 310). In addition, the computing device may receive (in step 308) other information to improve the accuracy of the risk value retrieved (in step 310) for a travel route. Some examples of this other information include, but are not limited to, the vehicle's speed (e.g., a vehicle without a sport suspension attempting to take a dangerous curve at a high speed), vehicle's speed compared to the posted speed limit, etc.

In accordance with aspects of the invention, a computer-readable medium storing computer-executable instructions for performing the steps depicted in FIGS. 2 and 3 and/or described in the present disclosure is contemplated. The computer-executable instructions may be configured for execution by a processor (e.g., processor 114 in computing device 102) and stored in a memory (e.g., memory 116 in computing device 102). Furthermore, as explained earlier, the computer-readable medium may be embodied in a non-volatile memory (e.g., in a memory in personal navigation device 110) or portable media (e.g., CD-ROM, DVD-ROM, USB flash, etc. connected to personal computing device 108).

In accordance with aspects of the invention, a personal navigation device 110 may calculate a route risk value for a travel route of a vehicle. The personal navigation device 110 may be located, for example, in a driver's vehicle, as a component of an autonomous driving system, or in a mobile device 112 with location tracking capabilities. Alternatively, a personal computing device 108 may be used to calculate the route risk value for a travel route of a vehicle.

Figure 4:
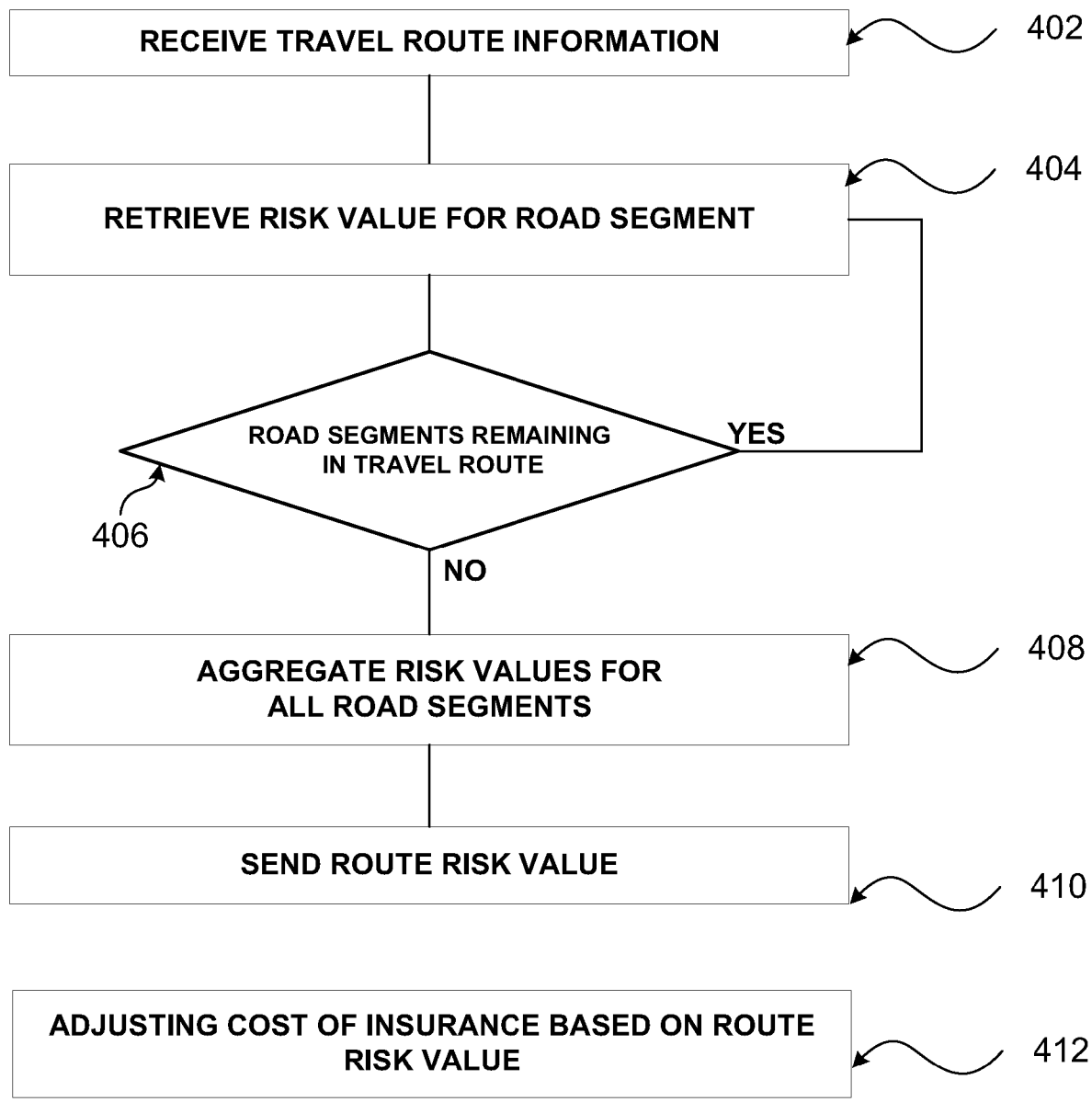
FIG. 4 depicts illustrative steps for calculating the risk value of a travel route in accordance with aspects of the invention.

For example, referring to FIG. 4, a personal navigation device 110 may receive (in step 402) travel route information. The travel route information may include, but is not limited to, a start location, end location, road-by-road directions, and/or turn-by-turn directions. The personal navigation device 110 may use the travel route information and mapping software to determine the road segment upon which the vehicle will travel, and retrieve (in step 404) the risk value for that road segment. For each subsequent road segment remaining in the travel route (see step 406), the personal navigation device 110 may access the database of risk values to retrieve (in step 404) the risk value for that road segment. As explained earlier, the database of risk values may be stored locally to the personal navigation device 110, or may be stored remotely and accessed through a wired/wireless link to the data store.

The risk values retrieved (in step 404) for the travel route may be aggregated (in step 408) and a total risk value for the travel route may be sent (in step 410). In an alternate embodiment, the computing device 102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product over all risk types may, in this alternate embodiment, equal the total route risk value. The total route risk value may be divided by the distance traveled to determine the route risk category for the travel route. For example, a route risk category may be assigned based on a set of route risk value ranges for low, medium, and high risk routes.

After being aggregated, the total risk value may be sent (in step 410) to a viewable display on the personal navigation device 110. Alternatively, the total risk value may be sent (in step 410) to a local/remote memory where it may be recorded and/or monitored. For example, it may be desirable for a safe driver to have her total risk value for all travel routes traveled over a time period to be uploaded to an insurance company's data store. The insurance company may then identify the driver as a lower-risk driver (e.g., a driver that travels on statistically lower-risk routes during lower-risk times) and provide the driver/vehicle with a discount and/or credit (in step 412) on an existing insurance policy (or towards a future insurance policy). At least one benefit of the aforementioned is that safe drivers and/or operators having safe autonomous driving systems are rewarded appropriately, while high-risk drivers and operators of autonomous vehicles are treated accordingly.

In some embodiments in accordance with aspects of the invention, the route risk value sent (in step 410) may be in the form of a number rating the risk of the travel route (e.g., a rating of 1 to 100 where 1 is very low risk and 100 is very high risk). Alternatively, the route risk value may be in the form of a predetermined category (e.g., low risk, medium risk, and high risk). At least one benefit of displaying the route risk value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route risk value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the invention, a computer-readable medium storing computer-executable instructions for performing the steps depicted in FIG. 4 and/or described in the present disclosure is contemplated. The computer-executable instructions may be configured for execution by a processor (e.g., a processor in personal navigation device 110) and stored in a memory (e.g., flash memory in device 110).

When retrieving risk values, in accordance with aspects of the invention, one or more techniques, either alone or in combination, may be used for identifying and calculating the appropriate risk value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data.

Under the accidents per year (APYR) approach, in accordance with aspects of the invention, each point of risk has a risk value that may reflect the average number of accidents a year for that individual point of risk. Under a modified APYR approach, the risk value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the invention, each point of risk has a risk value that may reflect the severity of risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the invention, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater risk value than driving through this same area at noon. The interaction of time of day and location would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high risk route (e.g., a high risk road segments).

Another possible approach may be to calculate the route risk value using one or more of the approaches described above divided by the length of the route traveled. This may provide an average route risk value for use in conjunction with a mileage rating plan. In one embodiment, the system combines route risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

Some accident data may be recorded and locally stored on a device (e.g., personal navigation device 110, mobile device 112, etc.) that provides incident location and a timestamp that can be used to synchronize other data located in data sources 104 and 106. The captured information may be periodically uploaded to computing device 102 for further processing of accident data for updating the road segment database in memory 116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each risk type. The personal navigation device 110 may initially provide the quickest/shortest route from a start location A to an end location B, and then determine the route risk value by determining either the sum product of the number of each risk type and the value for that risk type or the overall product of the number of each risk type and the value for that risk type. (Traffic and weather conditions could either be included or excluded from the determination of the route risk value for comparison of routes. If not included, an adjustment may be made to the route risk value once the route has been traveled). The driver may be presented with an alternate route which is less risky than the initial route calculated. The personal navigation device 110 may display the difference in risk between the alternate routes and permit the driver to select the preferred route. In some embodiments in accordance with the invention, a driver/vehicle may be provided a monetary benefit (e.g., a credit towards a future insurance policy) for selecting a less risky route.

In one example in accordance with aspects of the invention, a driver may enter a starting location and an end location into a personal navigation device 110, including a personal navigation device of an autonomous driving system. The personal navigation device 110 may present the driver with an illustrative 2-mile route that travels on a residential road near the following risks: 5 intersections, 3 past accident sites, 1 railroad crossing, and 1 lane merging site. Assuming for illustrative purposes that the following risk values apply to the following risk types:

| Risk Type | Risk-rating Factor |
| --- | --- |
| Intersections | 55 |
| Past Accidents | 30 |
| Railroad Crossing | 5 |
| Merge | 60 |
| Residential Road | 2 per mile |

Then, the route risk value for the entire 2-mile route may be calculated, in one embodiment of the invention, as follows:

| Risk Type | Risk-rating Factor | Count | Product |
|---|---|---|---|
| Intersections | 55 | 5 | 55 * 5 = 275 |
| Past Accidents | 30 | 3 | 30 * 3 = 90 |
| Railroad Crossing | 5 | 1 | 5 * 1 = 5 |
| Merge | 60 | 1 | 60 * 1 = 60 |
| Residential Road | 2 per mile | 2 | 2 * 2 = 4 |
| Sum Total | | | 434 |

Assuming a route risk value between 0 and 350 (per mile) is categorized as a low-risk route, then the aforementioned 2-mile route's risk value of 217 (i.e., 434 divided by 2) classifies it a low-risk route.

In some embodiments, for rating purposes the route risk value may consider the driving information of the driver/vehicle. For example, the personal navigation device 110 (or other device) may record the route taken, as well as the time of day/month/year, weather conditions, traffic conditions, and the actual speed driven compared to the posted speed limit. The current weather and traffic conditions may be recorded from a data source 104, 106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route risk value may be calculated and stored in memory along with the other information related to the route risk score and mileage traveled. This information may later be transmitted to an insurance company's data store, as was described above.

In another embodiment in accordance with aspects of the invention, real time data may be used to dynamically assign risk values to each point of risk. For example, some road segments may have a higher risk value when a vehicle travels through at a time when, e.g., snowfall is heavy. In such situations, a dynamic risk value may be applied to the road segment to determine the appropriate route risk value to assign to the route.

Figure 5:
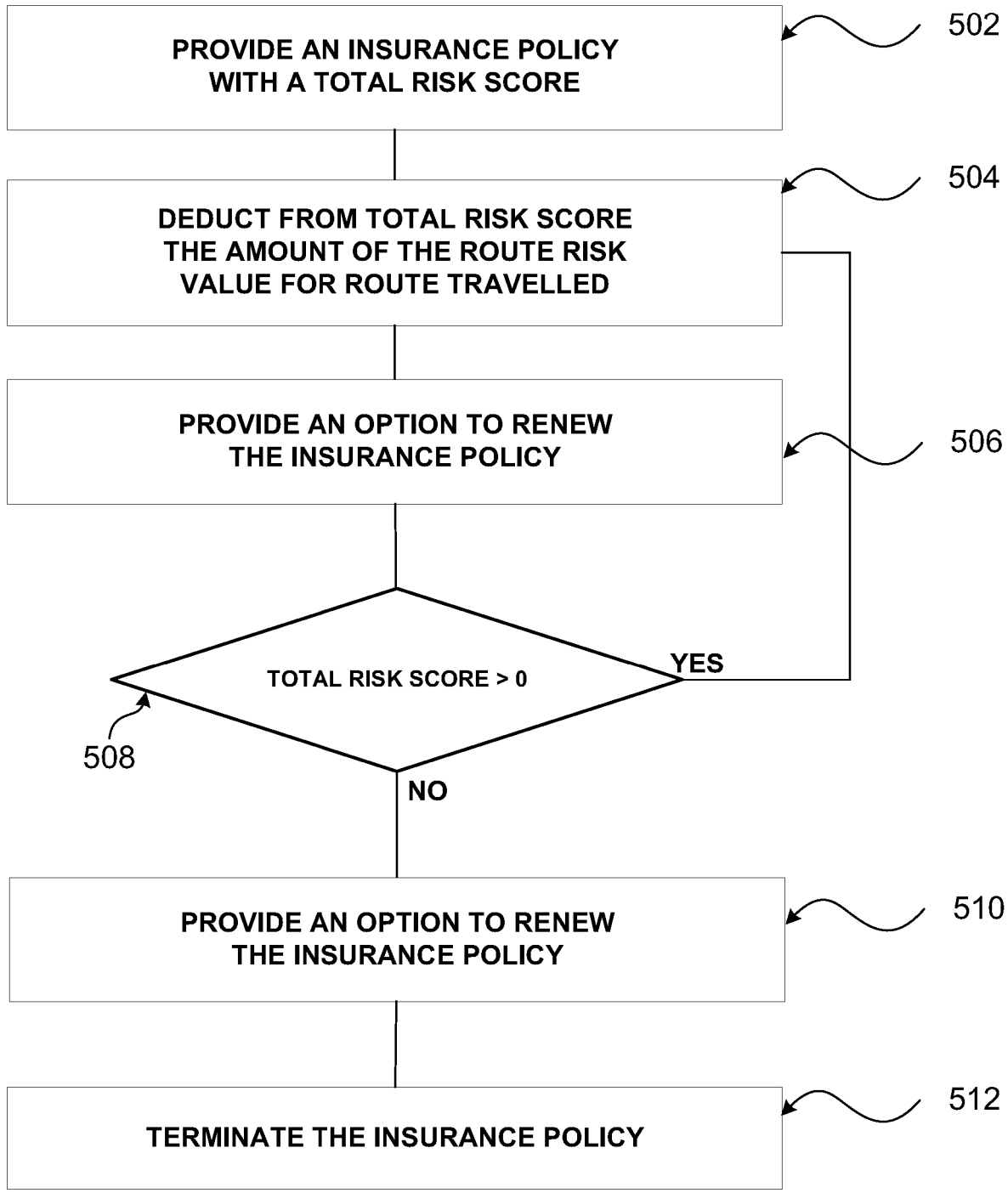
FIG. 5 depicts illustrative steps for providing an insurance policy based on risk consumption in accordance with aspects of the invention.

Referring to FIG. 5, in accordance with aspects of the invention, a method of selling a vehicular insurance policy is illustrated. A vehicle owner or driver may be provided (in step 502) with an insurance policy with a total risk score. The total risk score (e.g., 500) indicates the quantity of risk the vehicle is permitted to travel through before the insurance policy must be renewed or becomes terminated. For example, as the vehicle is driven over various travel routes, the route risk values for the road segments traveled are deducted (in step 504) from the total risk score of the insurance policy. The vehicle owner and/or driver may be provided (in step 506) an option to renew the insurance policy (e.g., to purchase additional risk points to apply towards the total risk score of the insurance policy). Once the total risk score falls to zero or under (see step 508), the vehicle owner and/or driver (or any other person/entity authorized to renew the policy) is provided (in step 510) with a final option to renew the insurance policy before the insurance policy terminates (in step 512). It will be apparent to one skilled in the art after review of the entirety disclosed that the embodiment illustrated above may benefit from a personal navigation device 110 (or similar device) to monitor and record the route traveled by a vehicle. At least one benefit of the insurance policy illustrated by FIG. 5 is the ability to pay per quantity of risk consumed instead of paying only a fixed premium.

In another embodiment in accordance with aspects of the invention, route-dependent pricing uses route risk values to adjust insurance pricing based on where a vehicle is driven. Contrary to the embodiment above where the vehicle's insurance policy terminated dependent on the quantity of risk consumed by the vehicle's travel route, in this embodiment, an insurance company (or its representatives, e.g., agent) may adjust the price quoted/charged for an insurance policy based on risk consumed. In this embodiment, a vehicle/driver may be categorized into a risk class (e.g., low-risk, medium-risk, high risk, etc.) and charged for insurance accordingly. For example, the vehicle/driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

Figure 6:
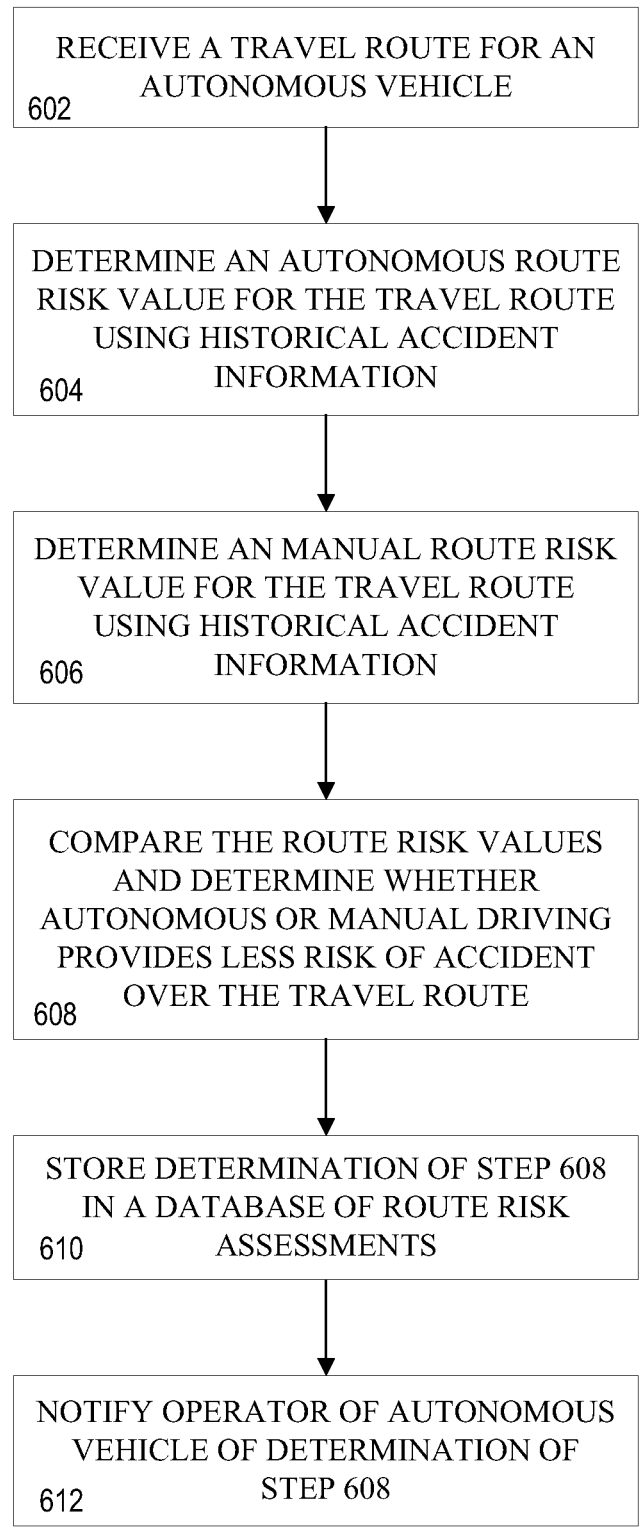
FIG. 6 depicts illustrative steps for analyzing historical accident information to determine whether autonomous or manual driving over a travel route provides less risk of accident.

Referring to FIG. 6, in another embodiment, an analysis of historical accident information can be performed to determine whether autonomous or manual driving over a travel route provides less risk of accident. In an embodiment, a travel route for an autonomous vehicle is received by the system (step 602). An analysis of historical accident information is performed for the travel route. The analysis includes identifying accident information for vehicles engaged in autonomous driving over the travel route and accident information for vehicles engaged in manual driving over the travel route. An autonomous route risk value for the travel route is determined using historical accident information of autonomous vehicles engaged in autonomous driving over the travel route (step 604). A manual route risk value for the travel route is determine using historical accident information for vehicles engaged in manual driving over the travel route (step 606). The autonomous route risk value and the manual route risk value is compared to determine whether autonomous driving or manual driving provides less risk of accident over the travel route (step 608). The determination for the travel route can be stored in a database (step 610) for use in, for example, future risk assessments of the travel route, making driving determinations for an autonomous vehicle over the travel route, and/or making manual driving decisions over the travel route. For example, in an embodiment, the determination of whether autonomous or manual driving provides less risk of accident over the travel route can be sent in a notification to the driver/operator of the autonomous vehicle (step 612).

Figure 7:
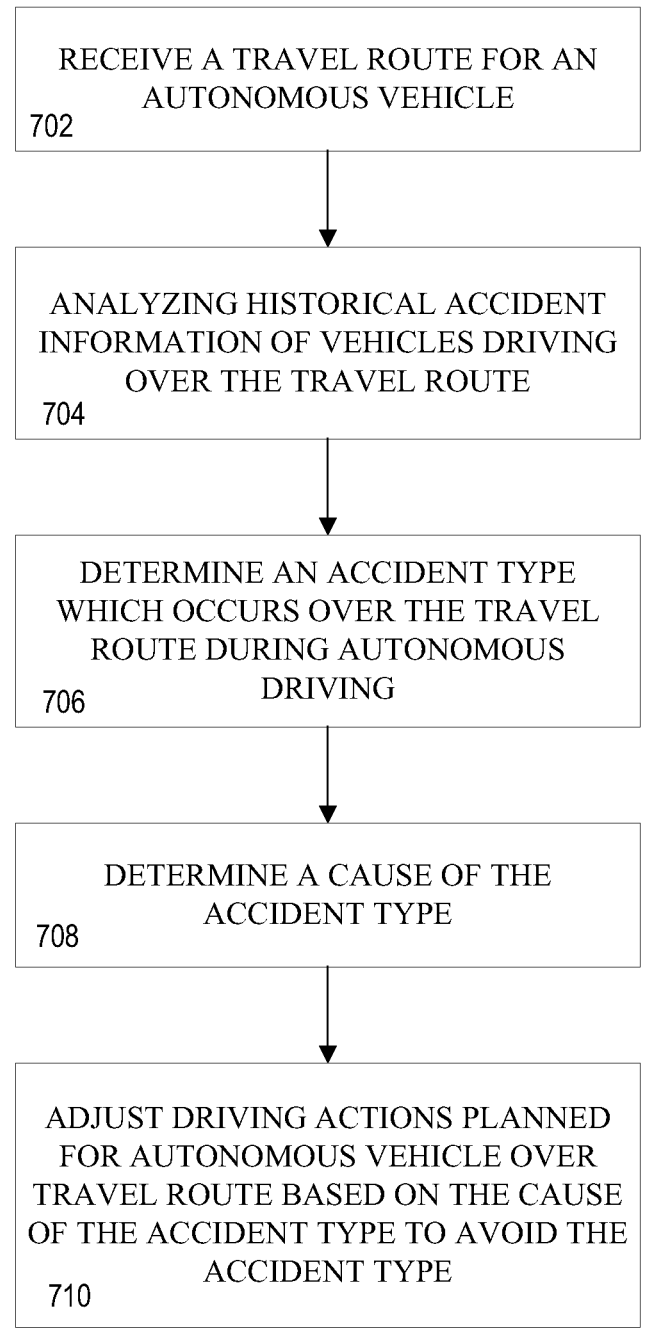
FIG. 7 depicts illustrative steps for analyzing historical accident information to adjust driving actions of an autonomous vehicle over a travel route in order to avoid accidents which have occurred over the travel route.

Referring to FIG. 7, in an embodiment, historical accident information can be used to adjust driving actions of an autonomous vehicle over a travel route in order to avoid accidents which have occurred over the travel route. In an embodiment, a travel route for an autonomous vehicle can be received or identified (step 702). Historical accident information for the travel route can be analyzed (step 704) to, for example, determine accident types which occurred over the travel route. The analysis can identify accidents which occurred while driving manually or autonomously (step 706) over the travel route. The analysis can include determining causes and/or probable causes of the accident types which occur over the travel route (step 708). In response to determining accident types and causes/probable causes of the accident types over the travel route, adjustments can be made to the driving actions planned for the autonomous vehicle over the travel route (step 710). The adjustments can be made based on the causes/probable causes of the accident types in order to avoid the accident types during travel over the travel route. For example, when a cause/probable cause of an accident type over a travel route is determined to be excess speed, the adjustment of driving actins planned for the autonomous vehicle can include a reduction of speed of travel of the autonomous vehicle over the travel route. In addition, for example, when a cause/probable cause of an accident type over a travel route is determined to be lack of vehicle traction on the road, the adjustment of driving actins planned for the autonomous vehicle can include engagement of an all-wheel-drive function of the autonomous vehicle over the travel route. In addition, for example, when a cause/probable cause of an accident type over a travel route is determined to be a wildlife crossing, the adjustment of driving actins planned for the autonomous vehicle can include reduction of a speed of travel and preparations for sudden braking and/or evasive maneuvers over the travel route.

Figure 8:
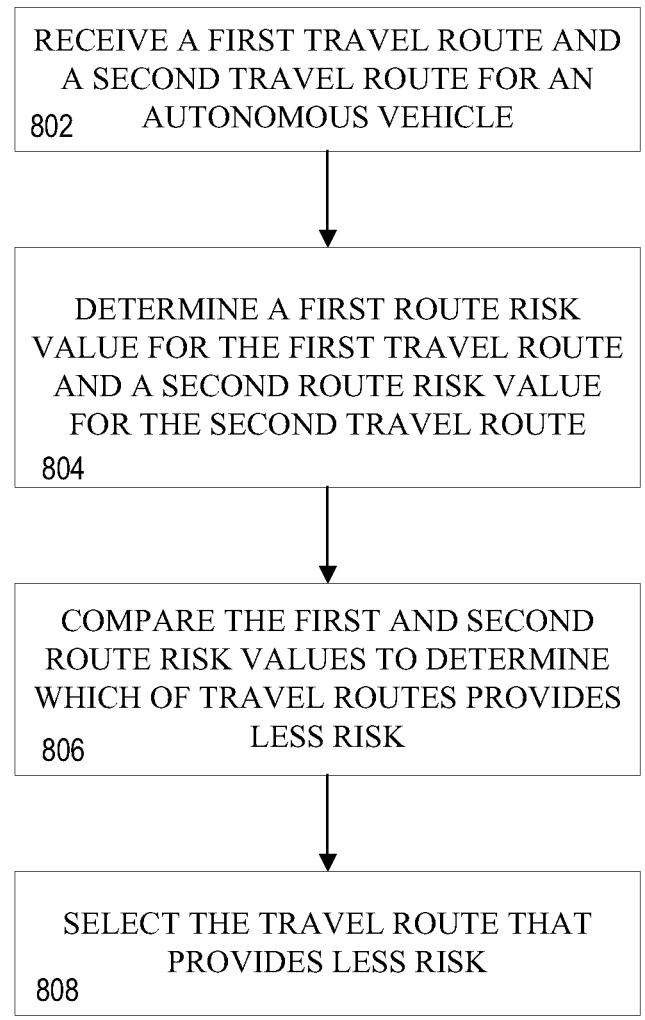
FIG. 8 depicts illustrative steps for analyzing historical accident information to determine risk values for available travel routes and select a travel route which presents less risk of accident than other travel routes.

Referring to FIG. 8, in an embodiment, historical accident information can be used to analyze available travel routes and select a route which presents less risk of accident than others. In an embodiment, at least two travel routes can be received by a risk analysis system (step 802). A route risk value can be determined for each of the travel routes (step 804). The route risk values for each travel route can be compared to determine which route provides less risk of accident over another (step 806). A driver or autonomous driving system can select a travel route on the basis that it provides less risk of accident than another travel route (step 808).

While the invention has been described with respect to specific examples including presently exemplary modes of carrying out the invention, those skilled in the art will appreciate that there are numerous variations and permutations of the above-described systems and techniques that fall within the spirit and scope of the invention.

What is claimed is:

1. A computer-implemented method, comprising:
receiving, by an autonomous driving system of an autonomous vehicle, vehicle travel information corresponding to driving conditions being experienced by the autonomous vehicle during travel to a destination, wherein the vehicle travel information comprises sensor information received from one or more sensors associated with the autonomous driving system;
receiving, by the autonomous driving system of the autonomous vehicle, travel route information identifying a first travel route for the autonomous vehicle to the destination and a second travel route for the autonomous vehicle to the destination;
determining, by the autonomous driving system of the autonomous vehicle, a first route risk value for the first travel route and a second route risk value for the second travel route;
selecting, by the autonomous driving system of the autonomous vehicle, a selected travel route according to the first route risk value and the second route risk value; and
receiving, by the autonomous driving system of the autonomous vehicle, historical accident information, wherein the historical accident information is associated with the selected travel route;
analyzing the historical accident information associated with vehicles engaged in autonomous driving over the selected travel route to identify at least one accident of a plurality of accidents that have historically occurred over the selected travel route;
validating the at least one accident occurred within a predetermined time relevancy threshold, wherein validating includes generating at least one validated accident; and
adjusting at least one driving action planned for operating the autonomous vehicle over the selected travel route according to the at least one validated accident.

2. The computer-implemented method of claim 1, wherein analyzing the historical accident information further comprises identifying a cause of the at least one validated accident, and wherein adjusting the at least one driving action is further based on the cause of the at least one validated accident.

3. The computer-implemented method of claim 2, wherein identifying the cause of the at least one validated accident comprises one or more of:
identifying the cause of the at least one validated accident to be excess speed, and wherein adjusting the at least one driving action planned for operating the autonomous vehicle over the selected travel route based on the cause of the at least one validated accident comprises reducing a speed of travel of the autonomous vehicle over the selected travel route,
identifying the cause of the at least one validated accident to be lack of vehicle traction, and wherein adjusting the at least one driving action planned for operating the autonomous vehicle over the selected travel route based on the cause of the at least one validated accident comprises engaging an all-wheel driving function of the autonomous vehicle over the selected travel route, or
identifying the cause of the at least one validated accident to be a wildlife crossing, and wherein adjusting the at least one driving action planned for operating the autonomous vehicle over the selected travel route based on the cause of the at least one validated accident comprises reducing the speed of travel of the autonomous vehicle and preparing the autonomous vehicle for sudden braking or evasive maneuvers over the selected travel route.

4. The computer-implemented method of claim 1, further comprising:
causing, by the autonomous driving system of the autonomous vehicle, a notification to be presented, the notification comprising information associated with the plurality of accidents which have historically occurred over the selected travel route.

5. The computer-implemented method of claim 4, wherein causing the notification to be presented comprises presenting a list of the plurality of accidents which have historically occurred over the selected travel route.

6. The computer-implemented method of claim 4, wherein causing the notification to be presented comprises presenting a route safety map which identifies where the plurality of accidents, that have historically occurred over the selected travel route, have occurred along the selected travel route.

7. The computer-implemented method of claim 1, wherein determining the first route risk value and the second route risk value is further based on loss cost associated with one or more accidents associated with the first travel route and the second travel route.

8. The computer-implemented method of claim 7, wherein the loss cost comprises medical cost associated with the one or more accidents.

9. The computer-implemented method of claim 7, wherein determining the first route risk value and the second route risk value is based on severity of the one or more accidents.

10. The computer-implemented method of claim 1, wherein analyzing the historical accident information further includes comparing the historical accident information associated with vehicles engaged in autonomous driving over the selected travel route and the historical accident information associated with vehicles engaged in manual driving over the selected travel route to identify if manual driving over the selected travel route provides less risk of accident.

11. An autonomous driving system of an autonomous vehicle, comprising:
  at least one processor; and
  memory storing instructions that, when executed by the at least one processor, cause the autonomous driving system of the autonomous vehicle to:
    receive vehicle travel information corresponding to driving conditions being experienced by the autonomous vehicle during travel to a destination, wherein the vehicle travel information comprises sensor information received from one or more sensors associated with the autonomous driving system;
    receive travel route information identifying a first travel route for the autonomous vehicle to the destination and a second travel route for the autonomous vehicle to the destination;
    select a selected travel route according to a first route risk value calculated for the first travel route and a second route risk value calculated for the second travel route;
    receive historical accident information, wherein the historical accident information is associated with the selected travel route;
    analyze the historical accident information associated with vehicles engaged in autonomous driving over the selected travel route to identify at least one accident of a plurality of accidents that have historically occurred over the selected travel route;
    validate the at least one accident occurred within a predetermined time relevancy threshold, wherein validating includes generating at least one validated accident; and
    adjust at least one driving action planned for operating the autonomous vehicle over the selected travel route according to the at least one validated accident.

12. The autonomous driving system of claim 11, wherein analyze the historical accident information further comprises identifying a cause of the at least one validated accident, and wherein adjusting the at least one driving action is further based on the cause of the at least one validated accident.

13. The autonomous driving system of claim 12, wherein the instructions, when executed by the at least one processor, further cause the autonomous driving system of the autonomous vehicle to:
  identify the cause of the at least one validated accident to be excess speed, and wherein adjust the at least one driving action planned for operating the autonomous vehicle over the selected travel route based on the cause of the at least one validated accident comprises reducing a speed of travel of the autonomous vehicle over the selected travel route,
  identify the cause of the at least one validated accident to be lack of vehicle traction, and wherein adjust the at least one driving action planned for operating the autonomous vehicle over the selected travel route based on the cause of the at least one validated accident comprises engaging an all-wheel driving function of the autonomous vehicle over the selected travel route, or
  identify the cause of the at least one validated accident to be a wildlife crossing, and wherein adjust the at least one driving action planned for operating the autonomous vehicle over the selected travel route based on the cause of the at least one validated accident comprises reducing the speed of travel of the autonomous vehicle and preparing the autonomous vehicle for sudden braking or evasive maneuvers over the selected travel route.

14. The autonomous driving system of claim 11, wherein the instructions, when executed by the at least one processor, further cause the autonomous driving system of the autonomous vehicle to:
  cause a notification to be presented, the notification comprising information associated with the plurality of accidents which have historically occurred over the selected travel route.

15. The autonomous driving system of claim 14, wherein causing the notification to be presented comprises presenting a route safety map which identifies where the plurality of accidents, that have historically occurred over the selected travel route, have occurred along the selected travel route.

16. The autonomous driving system of claim 11, wherein determining the first route risk value and the second route risk value is further based on loss cost associated with one or more accidents associated with the first travel route and the second travel route.

17. The autonomous driving system of claim 16, wherein the loss cost comprises medical cost associated with the one or more accidents.

18. The autonomous driving system of claim 16, wherein determining the first route risk value and the second route risk value is based on severity of the one or more accidents.

19. The autonomous driving system of claim 11, wherein analyzing the historical accident information further includes comparing the historical accident information associated with vehicles engaged in autonomous driving over the selected travel route and the historical accident information associated with vehicles engaged in manual driving over the selected travel route to identify if manual driving over the selected travel route provides less risk of accident.

20. One or more non-transitory, computer-readable media storing instructions that, when executed by an autonomous driving system of an autonomous vehicle comprising at least one processor and memory, cause the autonomous driving system of the autonomous vehicle to:
- receive vehicle travel information corresponding to driving conditions being experienced by the autonomous vehicle during travel to a destination, wherein the vehicle travel information comprises sensor information received from one or more sensors associated with the autonomous driving system;
- receive travel route information identifying a first travel route for the autonomous vehicle to the destination and a second travel route for the autonomous vehicle to the destination;
- determine a first route risk value for the first travel route and a second route risk value for the second travel route;
- select a selected travel route according to the first route risk value and the second route risk value;
- receive historical accident information, wherein the historical accident information is associated with the selected travel route;
- analyze the historical accident information associated with vehicles engaged in autonomous driving over the selected travel route to identify at least one accident of a plurality of accidents that have historically occurred over the selected travel route; and
- adjust at least one driving action planned for operating the autonomous vehicle over the selected travel route according to at least one validated accident of the at least one accident, wherein the at least one validated accident has occurred within a predetermined time relevancy threshold.

* * * * *